United States Patent [19]
Yang

[11] Patent Number: 5,774,378
[45] Date of Patent: Jun. 30, 1998

[54] SELF-VALIDATING SENSORS

[75] Inventor: Janice Ching-Yi Yang, East Killara, Australia

[73] Assignee: The Foxboro Company, Foxboro, Mass.

[21] Appl. No.: 705,982

[22] Filed: Aug. 30, 1996

Related U.S. Application Data

[63] Continuation-in-part of Ser. No. 406,805, Mar. 20, 1995, Pat. No. 5,570,300, which is a continuation of Ser. No. 51,192, Apr. 21, 1993, abandoned.

[51] Int. Cl.$^6$ .................................................. G01C 25/00
[52] U.S. Cl. ...................................... 364/571.02; 364/553
[58] Field of Search ............................. 364/571.02, 553, 364/557.01; 324/615–619

[56] References Cited

U.S. PATENT DOCUMENTS

| | | | |
|---|---|---|---|
| Re. 29,383 | 9/1977 | Gallatin et al. | 364/510 X |
| 3,096,434 | 7/1963 | King | 364/510 |
| 3,404,264 | 10/1968 | Kugler | 364/510 |
| 3,701,280 | 10/1972 | Stroman | 365/510 X |
| 4,085,975 | 4/1978 | Gilbert et al. | 60/39.281 |
| 4,530,234 | 7/1985 | Cullick et al. | 73/32 A |
| 4,934,196 | 6/1990 | Romano | 73/861.38 |
| 5,175,698 | 12/1992 | Barbanell | 364/553 |
| 5,325,339 | 6/1994 | Yost et al. | 367/13 |
| 5,339,680 | 8/1994 | Bronkal et al. | 73/118.2 |
| 5,440,237 | 8/1995 | Brown et al. | 324/601 |
| 5,570,300 | 10/1996 | Henry et al. | 364/551.01 |

FOREIGN PATENT DOCUMENTS

| | | |
|---|---|---|
| 0122622 | 10/1984 | European Pat. Off. . |
| 0413814 | 2/1991 | European Pat. Off. . |
| 2334827 | 12/1976 | France . |
| 3540204 | 9/1986 | Germany . |

OTHER PUBLICATIONS

Hashemian et al., "In–Situ Response Time Testing of Thermocouples," ISA, 1989, pp. 587–593.
Henry, "Intelligent Behaviour for Self–Validating Sensors," Advances in Measurement, pp. 1–7, date unknown.
Henry, "A New Approach to Sensor Validation," Improving Analyser Performance, IMC, Mar. 17, 1992.
Henry, "Signal Processing, Data Handling and Communications: The Case for Measurement Validation". date unknown.
Henry, "A Fault–Tolerant Interface for Self–Validating Sensors," IEE Colloquium, Digest No. 1990/145.
Henry et al., "A Standard Interface for Self–Validation Sensors," Report No. OUEL 1884/91, University of Oxford, Department of Engineering Science.
Henry et al., "The Implications of Digital Communications on Sensor Validation," Report No. OUEL 1912/92, University of Oxford, Department of Engineering Science.
Kerlin et al., "Smart Temperature Measurement in the '90s," C&I, Jul. 1990, pp. 43–47.

*Primary Examiner*—James P. Trammell
*Attorney, Agent, or Firm*—Fish & Richardson P.C.

[57] ABSTRACT

A sensor for provides a measurement and information about the validity of the measurement. The sensor includes a transducer for generating a data signal related to the value of a variable and a transmitter for receiving the data signal and generating output signals. The transmitter generates a first output signal related to the value of the variable. The transmitter also generates a second output signal based on a dynamic uncertainty analysis of the first output signal.

28 Claims, 31 Drawing Sheets

| Step/ (Fig. 6 step) | Action |
|---|---|
| 200 (72) | Get raw data. |
| 202 (74) | Calculate temperature RMV and RU. |
| 204 (74) | Calculate density RMV and RU. |
| 206 (74) | Calculate mass flow RMV and RU. |
| 208 (74) | Consider all inputs. |
| 210 (78, 80, 84, 86) | Make diagnosis. |
| 212 (80) | Correct all inputs. |
| 214 (82) | Calculate temperature VMV and VU. |
| 216 (82) | Calculate density VMV and VU. |
| 218 (82) | Calculate mass flow VMV and VU. |

FIG. 12

| Step | Action |
|---|---|
| 250 | R = (RK1 * tran_temp + RK2) * f_RTD + RK3 * tran_temp + RK4

[RK1-4 are calibration constants, tran_temp is the temperature of transmitter 154, and f_RTD is the frequency of the signal coming out of RTD temperature sensor 176.] |
| 252 | d_R = sqrt (
      sqr (tran_temp * f_RTD * d_RK1) +
      sqr (f_RTD * d_RK2) +
      sqr (tran_temp * d_RK3) +
      sqr (d_RK4) +
      sqr ((RK1 * f_RTD + RK3) * d_tran_temp) +
      sqr ((RK1 * tran_temp + RK2) * d_f_RTD))

[d_x is the uncertainty of x.] |
| 254 | temperature = RTD_A * R * R + RTD_B * R + RTD_C |
| 256 | d_temperature = (2.0 * RTD_A * R + RTD_B) * d_R |

FIG. 13

| Step | Action |
|------|--------|
| 300 | Check RTD_input_state |
| 302 |     If RTD_INPUT_OK |
| 304 |         If RTD_resistance < 80.0 |
| 306 |             RTD_input_state = RTD_INPUT_LOST |
| 308 |             If RTD_spike_state <> RTD_SPIKE_OFF |
| 310 |                 RTD_spike_state = RTD_SPIKE_OFF |
| 312 |     If RTD_INPUT_LOST |
| 314 |         If RTD_resistance < 100.0 |
| 316 |             Temperature MV status = BLIND |
| 318 |             Substitute historical temperature |
| 320 |             Density MV status = BLURRED |
| 322 |             Mass Flow MV status = BLURRED |
| 324 |         Else |
| 326 |             RTD_input_state = RTD_INPUT_RECOVER |
| 328 |             RTD_input_count = 0 |
| 330 |     If RTD_INPUT_RECOVER |
| 332 |         Merge past and present temperature |
| 334 |         If RTD_input_count = 90 |
| 336 |             RTD_input_state = RTD_INPUT_OK |
| 338 |         Else |
| 340 |             Temperature MV status = BLURRED |
| 342 |             Increment RTD_input_count |

FIG. 14

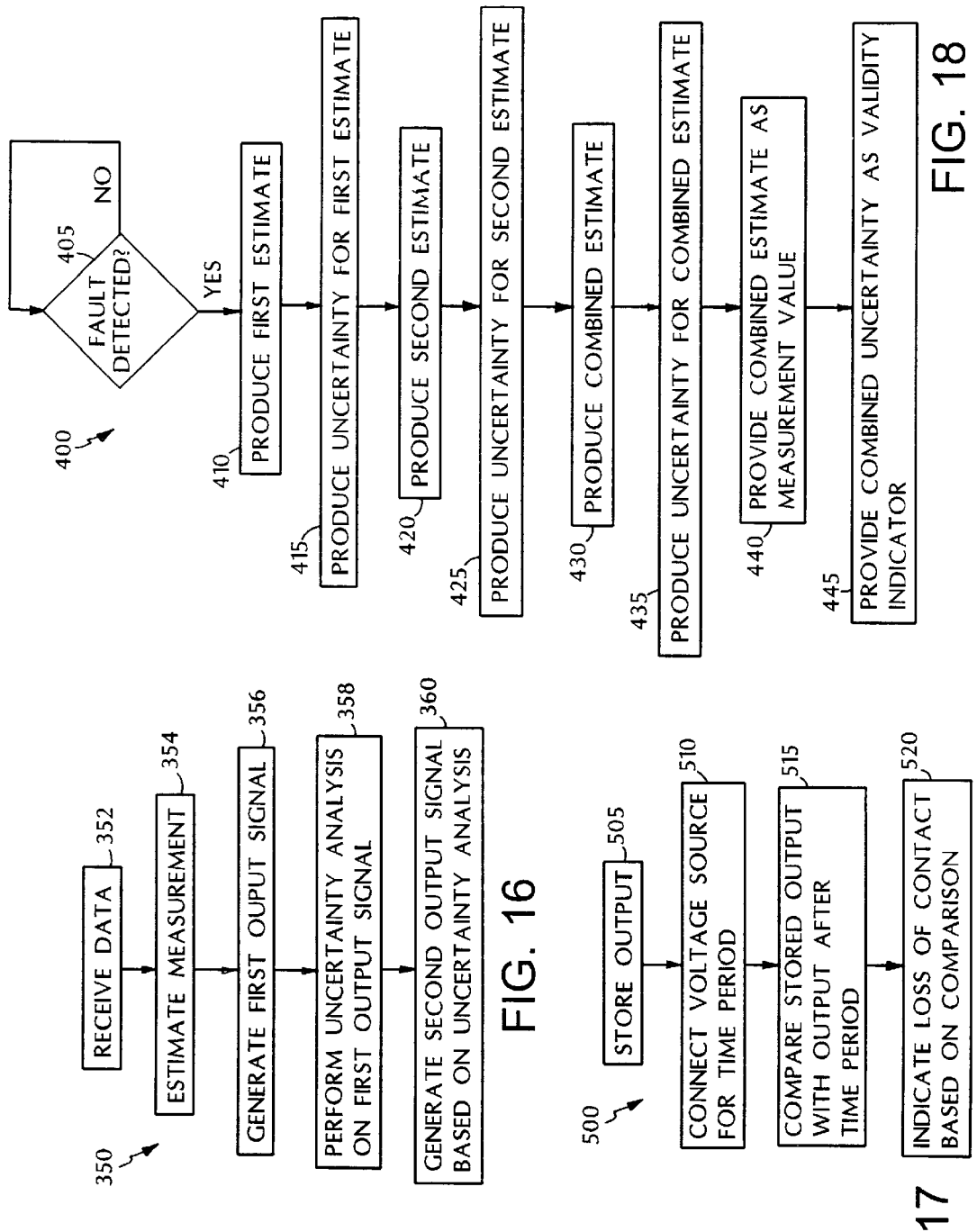

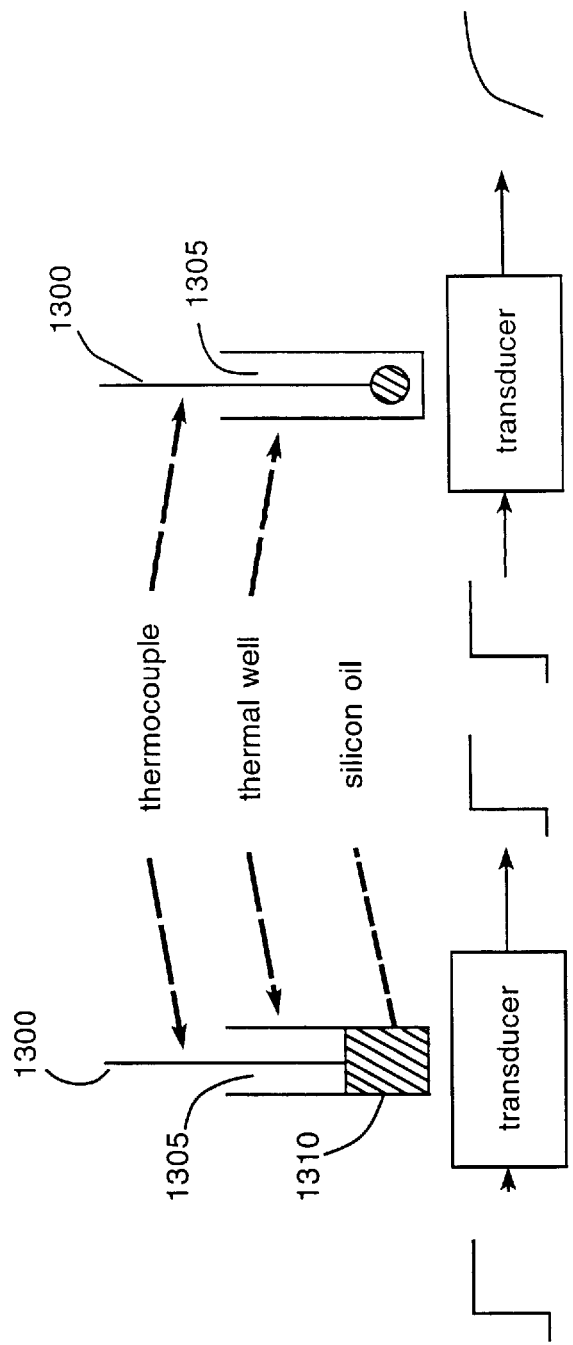

SELF-VALIDATING SENSORS

This application is a continuation-in-part of U.S. application Ser. No. 08/406,805, filed Mar. 20, 1995, now U.S. Pat. No. 5,570,300 allowed, which is a continuation of U.S. application Ser. No. 08/051,192, filed Apr. 21, 1993, now abandoned. These applications are incorporated herein by reference.

BACKGROUND OF THE INVENTION

This invention relates to sensors and to control systems incorporating sensors.

A sensor generates measurement data. Typically, the measurement data is a signal that approximates the value of a process variable (a measurand). In practice, the signal does not perfectly represent the value of the process variable. Instead, the signal also includes effects resulting from the sensor (such as sensor faults or distortion) and other process influences (including those attributable to "faulty" process behavior).

SUMMARY OF THE INVENTION

The invention provides a technique for compensating for variations in the transfer function of a sensor. These variations also may be referred to as sensor dynamics. For an ideal sensor, a desired measurement $m_d$ is related to a measurand m by the transfer function G(s) of the sensor:

$$M_d = mG(s)$$

However, variations in the transfer function G(s) of the sensor may result in a sensor reading x that differs from the desired measurement $M_d$. For example, a loss of contact fault in a thermocouple can cause a decrease in the responsiveness of a measurement system including the thermocouple.

The invention provides a technique that corrects for variations in the transfer function G(s) of the sensor. The technique uses knowledge of the actual transfer function $G_a(s)$ and the desired transfer function $G_d(s)$ of the sensor. In most instances, the desired transfer function is known and the actual transfer function can be determined from the sensor. For example, the actual transfer function of a thermocouple may be determined using current injection tests. Using the sensor reading x and an inverse of the actual transfer function $G_a(s)'$, the technique produces a compensated measurement $m_c$ that closely resembles the measurand m:

$$m_c = xG_a(s)',$$

where $$x = mG_a(s).$$

The compensated measurement $m_c$ is then filtered using the desired transfer function $G_d(s)$ to produce the desired measurement:

$$m_d = m_c G_d(s) = (xG_a(s)') \, G_d(s) = (mG_a(s))G_a(s)'G_d(s) = mG_d(s).$$

The invention also includes techniques for determining the uncertainty of the corrected measurement, and for determining the uncertainty of combinations of related signals.

In one aspect, generally, the invention features a method of compensating for variations in a transfer function of a sensor. The method includes identifying a desired transfer function for the sensor and determining an actual transfer function for the sensor. Upon receiving a measurement produced by the sensor, the method modifies the measurement based on the desired and actual transfer functions to produce a modified measurement. The method then provides the modified measurement as a measurement value for the sensor. It should be understood that references in the specification and claims to desired and actual transfer function are meant to encompass discrete time equivalents of those functions.

Embodiments of the invention may include one or more of the following features. The desired transfer function may be identified from design criteria for the sensor. When the actual transfer function varies with time, the actual transfer function may be determined for a particular time or period of time for which a measurement value is to be produced. For example, when the sensor includes a thermocouple, the actual transfer function may be determined using current injection tests.

A compensated measurement may be produced by modifying the measurement based on an inverse of the actual transfer function. The modified measurement may be produced by modifying the compensated measurement based on the desired transfer function.

The method may further include generating an uncertainty measure for the measurement value. The uncertainty measure may be generated by generating a first uncertainty measure for the compensated measurement, generating a second uncertainty measure for the desired transfer function and combining the first and second uncertainty measures to produce the uncertainty measure for the measurement value. The first uncertainty measure for the compensated measurement may be generated by generating a third uncertainty measure for the measurement produced by the sensor, generating a fourth uncertainty measure for the inverse of the actual transfer function, and combining the third and fourth uncertainty measures to produce the first uncertainty measure for the compensated measurement.

Other features and advantages will become apparent from the following description, including the drawings, and from the claims.

BRIEF DESCRIPTION OF THE DRAWING

FIG. 10-1 and 10-2 are a paired composite graph of auxiliary data (FIG. 10-1) and validated temperature and uncertainty (FIG. 10-2) for the instrument of FIG. 7.

FIG. 12 is pseudocode showing steps performed by the meter of FIG. 11 during each sampling period.

FIG. 13 is pseudocode showing steps performed by the meter of FIG. 11 in determining temperature and associated uncertainty.

FIG. 14 is pseudocode showing steps performed by the meter of FIG. 11 in diagnosing a fault.

FIG. 15a-1, 15a-2, 15b-1, 15b-2, 15c-1 and 15c-2 are sets of composite graphs showing the effect of a loss of temperature on temperature (upper graphs), density (middle graphs) and mass flow rate (lower graphs) versus time for the meter of FIG. 11.

FIG. 16 is a flow chart of a procedure for generating a signal based on the uncertainty analysis.

FIG. 17 is a flow chart of a procedure for responding to the detection of a fault.

FIG. 18 is a flow chart of a procedure for detecting a loss of contact fault.

FIGS. 23A and 23B are schematics of a thermocouple.

DESCRIPTION OF THE PREFERRED EMBODIMENTS

Figure 1:
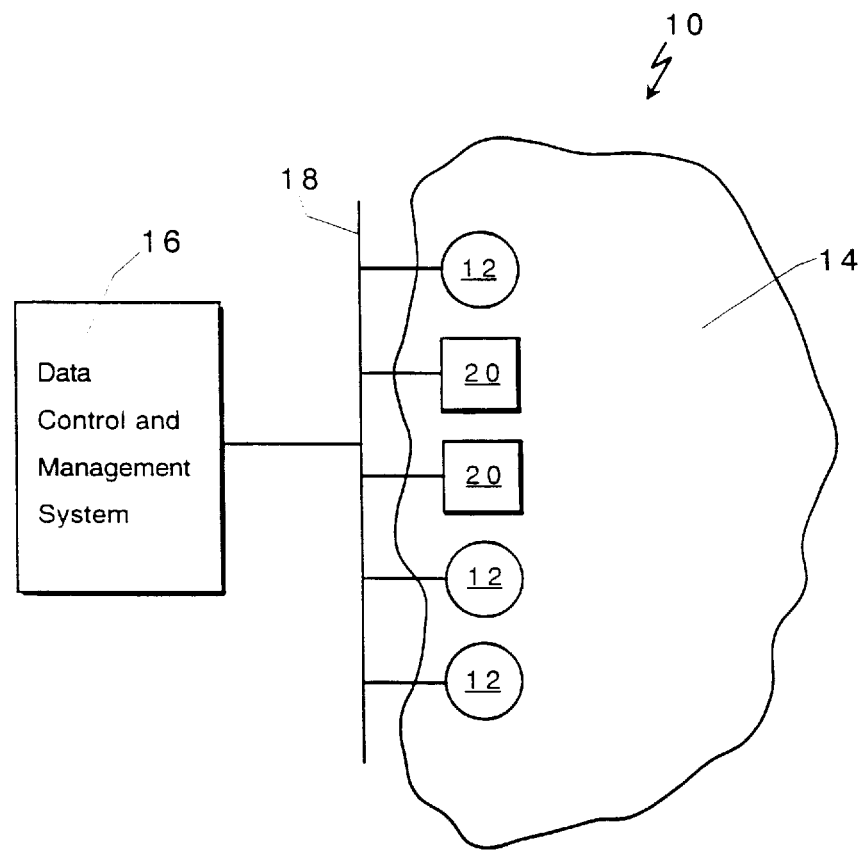
FIG. 1 is a block diagram of a process control system with multiple sensors and actuators.

Referring to FIG. 1, in a process control system 10, a plurality of sensors 12 monitor parameters of a process 14 and provide signals about the monitored parameters to a data control and management system 16 on a digital communications link 18. Digital communications link 18 allows bidirectional communication between multiple central processing units 16, sensors 12, and process actuators 20. In response to signals from sensors 12, data control and management system 16 sends process control signals to process actuators 20 on digital communications link 18. Thereafter, process actuators 20 respond to process control signals from data control and management system 16 by modifying parameters of process 14.

Because data control and management system 16 relies on measurement signals from sensors 12 in controlling process 14, measurement signals from sensors 12 need to be accurate and reliable. A given sensor 12 typically cannot guarantee complete accuracy and reliability; instead, sensor 12 provides data control and management system 16 with indications of the uncertainty (which, in turn, indicates the accuracy) and the reliability of the measurement signals.

Figure 2:
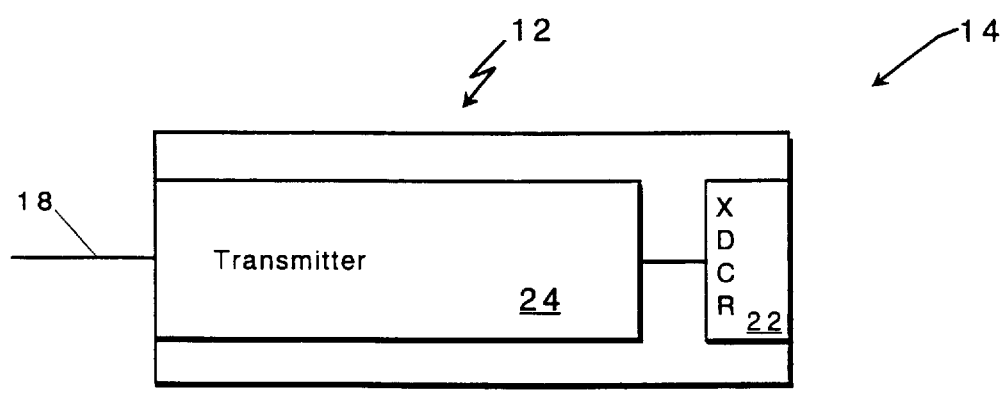
FIG. 2 is a block diagram of a sensor according to the invention.

Referring also to FIG. 2, sensor 12 includes one or more transducers 22 that monitor the values of parameters of process 14 and provide signals to a transmitter 24. Transmitter 24 samples the signals from transducers 22 and produces measurement values for the parameters being monitored by transducers 22. Transmitter 24 validates the measurement values and provides the validated measurement values, along with an indication of the uncertainty of the validated measurement values, to data control and management system 16 via digital communications link 18. In addition, transmitter 24 generates signals indicating the reliability of the validated measurement values provided by sensor 12 and the operational status of sensor 12, and provides these signals to data control and management system 16 via digital communications link 18.

Transmitter 24 generates the signals provided to data control and management system 16 during a sample period and transmits the signals at the end of the sample period. Typically, the duration of a sample period is less than one second, but this duration can be adjusted as required by a particular application.

Figure 3:
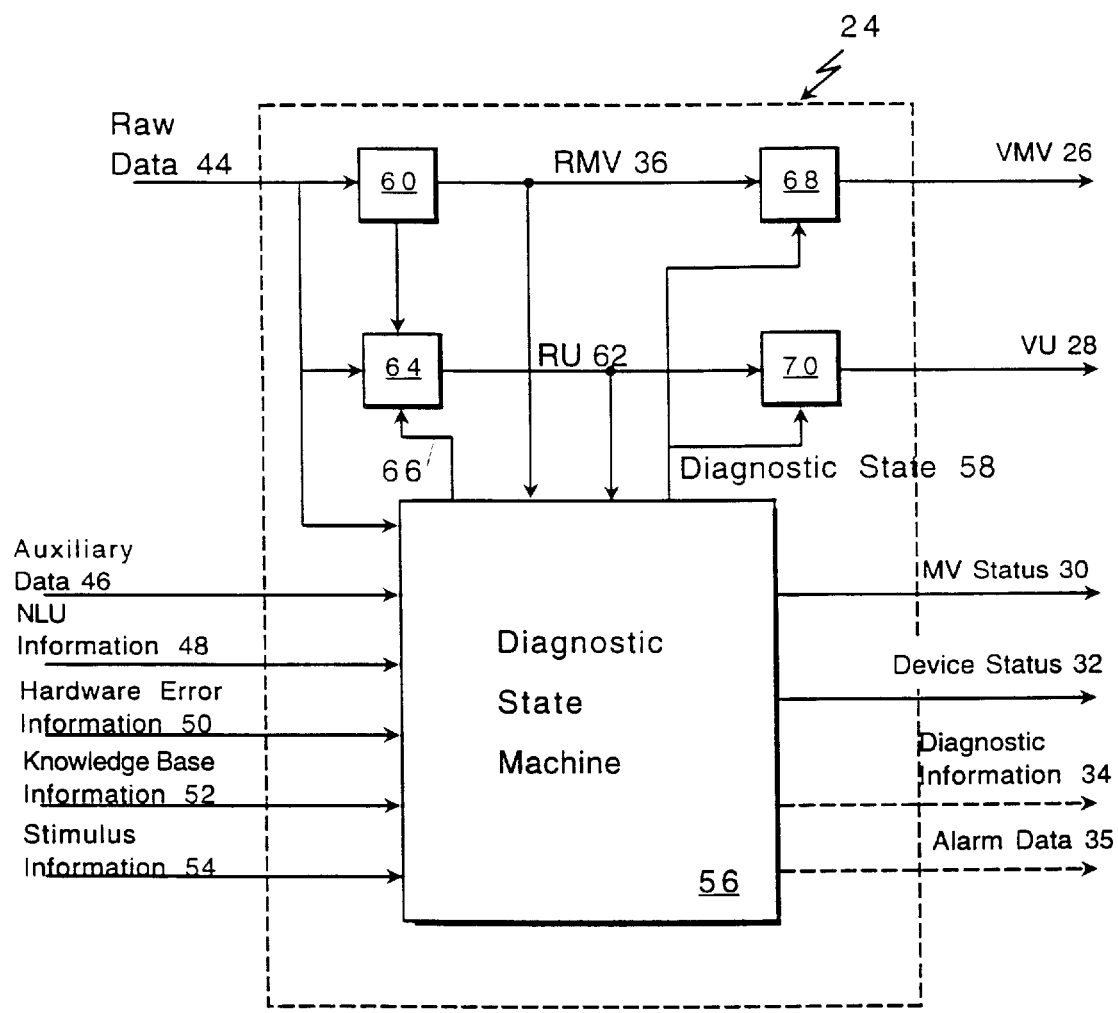
FIG. 3 is a block diagram showing the flow of information in the sensor of FIG. 2.

As shown in FIG. 3, transmitter 24 typically provides four signals to data control and management system 16:

(1) VMV 26—a validated measurement value of a process parameter (transmitter 24's best estimate of the value of the measured parameter), (2) VU 28—a validated uncertainty associated with VMV 26, (3) MV status 30—the status of VMV 26 (the manner in which VMV 26 was calculated), and (4) device status 32—the operational status of the sensor.

If sensor 12 measures multiple process parameters, transmitter 24 produces a version of VMV 26, VU 28, and MV status 30 for each process parameter.

In some circumstances, transmitter 24 can provide additional information. For example, upon a request by data control and management system 16, transmitter 24 provides detailed diagnostic information 34 about the status of sensor 12. Also, when a measurement has exceeded, or is about to exceed, a predetermined limit, transmitter 24 can send alarm data 35. Typically, different alarm levels can be used to indicate the severity with which the measurement has deviated from the predetermined value.

VMV 26 and VU 28 are numeric values. For example, VMV 26 could be a temperature measurement valued at 200 degrees and VU 28, the uncertainty of VMV 26, could be 9 degrees. In this case, there is a high probability (typically 95%) that the actual temperature being measured falls within an envelope around VMV 26 and designated by VU 28 (191 degrees to 209 degrees).

Transmitter 24 generates VMV 26 based on a signal produced by transducer 22. First, transmitter 24 derives RMV 36, an unvalidated image of the measured process parameter that is based on the signal generated by transducer 22. Typically, when transmitter 24 detects no abnormalities in sensor 12, transmitter 24 has nominal confidence in RMV 36 and sets VMV 26 equal to RMV 36.

As discussed in more detail below, when transmitter 24 detects an abnormality in sensor 12, transmitter 24 does not set VMV 26 equal to RMV 36. Instead, transmitter 24 sets VMV 26 to a value that transmitter 24 considers to be a better estimate of the actual parameter than RMV 36. If transmitter 24 detects a fault in sensor 12 that only partially affects the reliability of RMV 36 such that transmitter 24 has reduced confidence in RMV 36, transmitter 24 typically rederives RMV 36 by modifying the parameters used in deriving RMV 36 to account for the fault, and sets VMV 26 equal to the new value of RMV 36. Alternatively, if transmitter 24 detects a fault in sensor 12 which indicates that RMV 36 bears no relation to the actual measured value such that transmitter 24 has zero confidence in RMV 36, transmitter 24 sets VMV 26 to a value based on past performance.

Figure 4A:
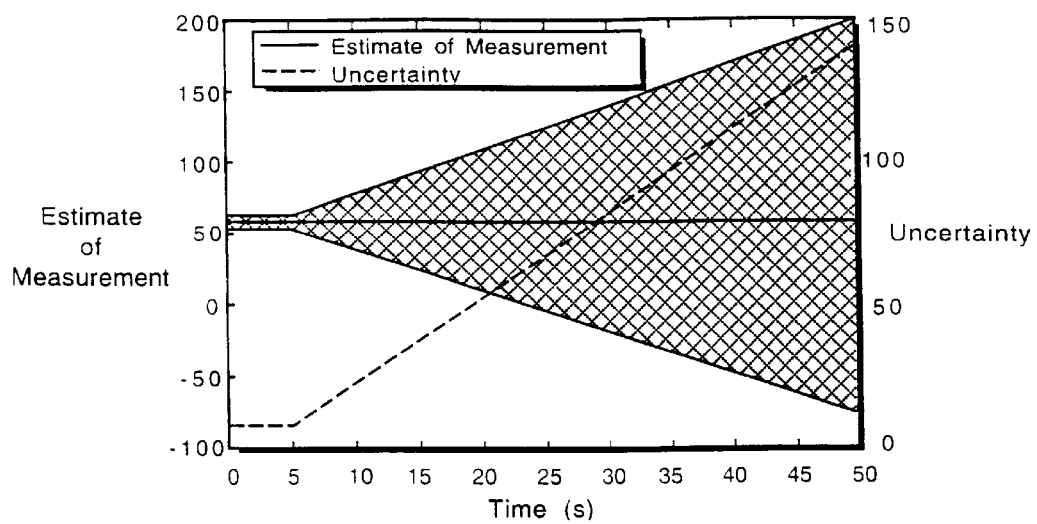
FIG. 4a, b, c are composite graphs showing three methods of responding to a fault in the sensor of FIG. 2.
Figure 4B:
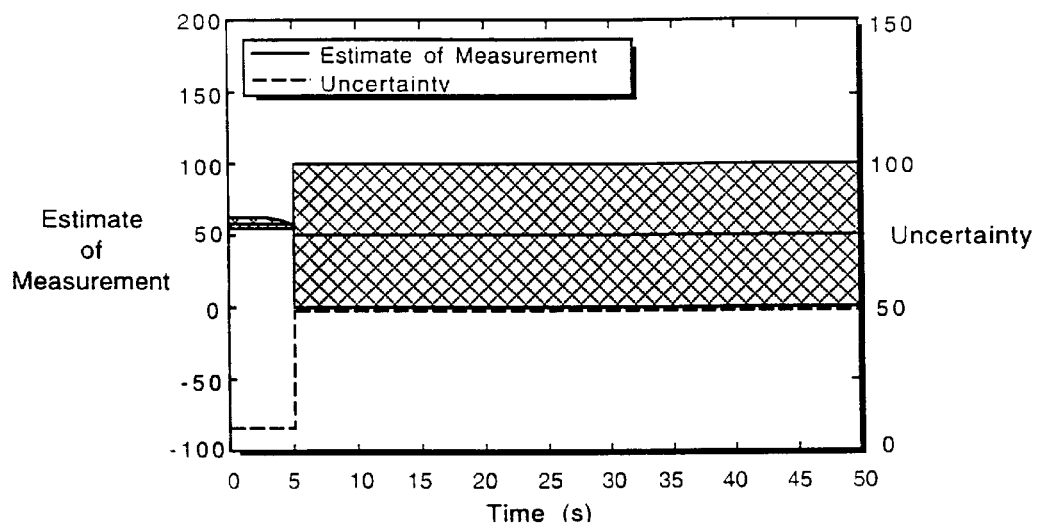
Figure 4C:
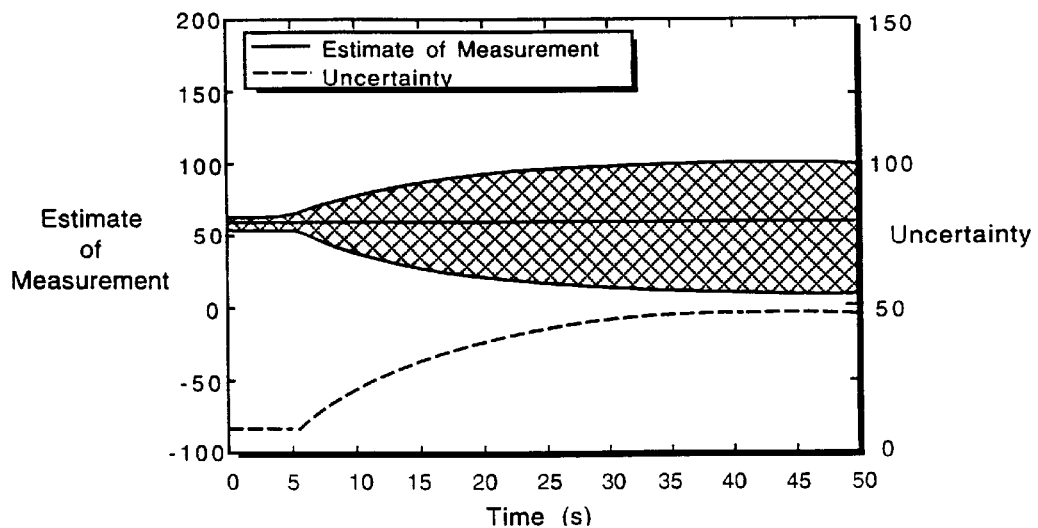

Referring also to FIG. 4, three examples of past performance values include short term past values, long term past values, and a combination of long and short term past values. As shown in (a), when short term past values are used, VMV 26 can equal the value of VMV 26 had immediately prior to the fault that occurs at time 5. As shown in (b), when long term past value are used, VMV 26 can equal the average value of VMV 26. As shown in (c), when a combination of long and short term past values is used, the long and short term past values can be combined using the following equation, which weighs each value according to its uncertainty:

$$VMV_{L\&S} = \frac{VU_L^2}{VU_L^2 + VU_S^2} * VMV_S + \frac{VU_S^2}{VU_L^2 + VU_S^2} * VMV_L$$

where $VU_L$ and $VU_S$ are the long and short term past values for VU 28 and $VMV_L$ and $VMV_S$ are the long and short term past values for VMV 26.

Transmitter 24 generates VU 28 based on a raw uncertainty signal, RU 62, that is the result of a dynamic uncertainty analysis of RMV 36. Transmitter 24 performs this uncertainty analysis during each sampling period.

Uncertainty analysis, originally described in "Describing Uncertainties in Single Sample Experiments," S. J. Kline & F. A. McClintock, *Mech. Eng.*, 75, 3–8 (1953), has been widely applied and has achieved the status of an international standard for calibration. Essentially, an uncertainty analysis provides an indication of the "quality" of a measurement. Every measurement has an associated error, which, of course, is unknown. However, a reasonable limit on that error can often be expressed by a single uncertainty number (ANSI/ASME PTC 19.1—1985 Part 1, Measurement Uncertainty: Instruments and Apparatus).

As described by Kline & McClintock, for any observed measurement M, the uncertainty in M, $W_M$, can be defined as follows:

$$M_{true} \epsilon [M-W_M, M+W_M]$$

where M is true ($M_{true}$) with a certain level of confidence (typically 95%). This uncertainty is readily expressed in a relative form as a proportion of the measurement (i.e. $W_M/M$).

A propagation rule exists for obtaining the uncertainties of arbitrary functions of primary measurements. For example, for an arbitrary function R of variables X, Y, and Z, $$R=R(X,Y,Z)$$

the uncertainty of R is given by $$[w_R/R]^2=[\partial R/\partial X]^2[w_x/R]^2+[\partial R/\partial Y]^2[w_y/R]^2+[\partial R/\partial Z]^2[w_z/R]^2$$

This sum of squares form is derived from the Taylor series, and assumes the independence of X, Y, and Z, that their relative uncertainties are "small", and that all uncertainties are expressed at the same probability level. For purposes of this application, all uncertainties are assumed to be at 95% probability.

One of the uses of the uncertainty propagation formula is to reveal particular circumstances that can result in a higher or lower than expected level of uncertainty. For example, as discussed in S. J. Kline, "The Purposes of Uncertainty Analysis", *ASME Journal of Fluids Engineering*, Vol. 107, No. 2, pp. 153–160, 1985, if R is calculated from x and y using the equation $$R=x-y,$$

the uncertainty in R, $w_R$, is given by $$w_R/R=[(x/(x-y)*w_x/x)^2+(y/(x-y)*w_y/y)^2]^{1/2}.$$

If x=1.0, y=0.98, and the uncertainty in both x and y is 1%, then the uncertainty in R is:

$$w_R/R = [(1/0.02 * 0.01)^2 + (0.98/0.02 * 0.01)^2]^{1/2}$$
$$= 0.700 = 70\%.$$

By comparison, if R is calculated from a variable z using the equation $$R=(1/(1+Z))^{1/12},$$

the uncertainty in R is given by $$W_R/R=w_z/2(1+z).$$

If z=0.1 and the uncertainty is z is 20%, then the uncertainty in R is only 0.91%.

On reflection these results should not be surprising. In the first example, two quantities of similar magnitude are being subtracted, which will increase the relative error in the result. In the second, although z has a large uncertainty, its influence on R is relatively small. Of course, for different values of x, y, and z, the impact of their uncertainties will vary. Uncertainty analysis is useful in that it can quantify these effects.

Returning to FIG. 3, VU 28 has a non-zero value even under ideal conditions (i.e., a faultless sensor operating in a controlled, laboratory environment). This is because the measurement produced by a sensor is never completely certain and there is always some potential for error.

As with VMV 26, when transmitter 24 detects no abnormalities in sensor 12, transmitter 24 sets VU 28 equal to RU 62. When transmitter 24 detects a fault in sensor 12 that only partially affects the reliability of RMV 36, transmitter 24 typically performs a new uncertainty analysis that accounts for effects of the fault and sets VU 28 equal to the results of this analysis. As with VMV 26, transmitter 24 sets VU 28 to a value based on past performance when transmitter 24 determines that RMV 36 bears no relation to the actual measured value.

FIG. 4 illustrates three exemplary techniques for adjusting VU 28 based on past performance values. First, as shown in (a), VU 28 can be increased during each sampling period by the maximum observed rate of change of VMV 26. This technique, which tends to give good short term results, eventually produces unrealistic values for VU 28. Next, as shown in (b), when VMV 26 is set equal to the long term average of VMV 26, VU 28 can indicate that VMV 26 can take any previous value of VMV 26. Thus, if VMV 26 always falls between 0 and 100 and VMV 26 is set to 50, VU 28 is set to 50. This technique tends to give unduly pessimistic short term results, but avoids the long term problems of method (a). Finally, as shown in (c), when VMV 26 is based on a combination of the long and short term past values for VMV 26, VU 28 can be calculated as follows:

$$VU_{L\&S} = \frac{VU_L * VU_S}{(VU_L^2 + VU_S^2)^{1/2}}$$

where $VU_L$ and $VU_S$ are the long and short term past values for VU 28.

To ensure that data control and management system 16 uses VMV 26 and VU 28 properly, MV status 30 provides information about how VMV 26 and VU 28 were calculated. Transmitter 24 produces VMV 26 and VU 28 under all conditions—even when transducers 22 are inoperative. Often, data control and management system 16 needs to know whether VMV 26 and VU 28 are based on "live" or historical data. For example, if data control and management system 16 were using VMV 26 and VU 28 in feedback control and transducers 22 were inoperative, data control and management system 16 would need to know that VMV 26 and VU 28 were based on past performance.

MV status 30 is based on the expected persistence of any abnormal condition and on the confidence of transmitter 24 in RMV 36. The four primary states for MV status are generated according to Table 1.

TABLE 1

| Expected Persistence | Confidence in RMV | MV Status |
| --- | --- | --- |
| not applicable | nominal | CLEAR |
| not applicable | reduced | BLURRED |
| short | zero | DAZZLED |
| long | zero | BLIND |

A CLEAR MV status 30 occurs when RMV 36 is within a normal range for given process conditions. A DAZZLED MV status 30 indicates that RMV 36 is quite abnormal, but the abnormality is expected to be of short duration. Typically, transmitter 24 sets MV status 30 to DAZZLED when there is a sudden change in the signal from transducer 22 and transmitter 24 is unable to clearly establish whether this change is due to an as yet undiagnosed sensor fault or to an abrupt change in the variable being measured. A BLURRED MV status 30 indicates that RMV 36 is abnormal but reasonably related to the parameter being measured. For example, transmitter 24 may set MV status 30 to BLURRED when RMV 36 is a noisy signal. A BLIND MV status 30 indicates that RMV 36 is completely unreliable and the fault is expected to persist.

Two additional states for MV status 30 are UNVALIDATED and SECURE. MV status 30 is UNVALIDATED when transmitter 24 is not performing validation of VMV 26. MV status 30 is SECURE when VMV 26 is generated from redundant measurements in which transmitter 24 has nominal confidence.

Device status 32 is a generic, discrete value summarizing the health of sensor 12 that is used primarily by fault detection and maintenance systems. Typically, device status 32 is in one of six states, each of which indicates a different operational status for sensor 12. These states are: GOOD, TESTING, SUSPECT, IMPAIRED, BAD, or CRITICAL. A GOOD device status 32 means that sensor 12 is in nominal condition. A TESTING device status 32 means that sensor 12 is performing a self check, and that this self check may be responsible for any temporary reduction in measurement quality. A SUSPECT device status 32 means that sensor 12 has produced an abnormal response, but transmitter 24 has no detailed fault diagnosis. An IMPAIRED device status 32 means that sensor 12 is suffering from a diagnosed fault that has a minor impact on performance. A BAD device status 32 means that sensor 12 has seriously malfunctioned and maintenance is required. Finally, a CRITICAL device status 32 means that sensor 12 has malfunctioned to the extent that sensor 12 may cause (or have caused) a hazard such as a leak, fire, or explosion.

Figure 5:
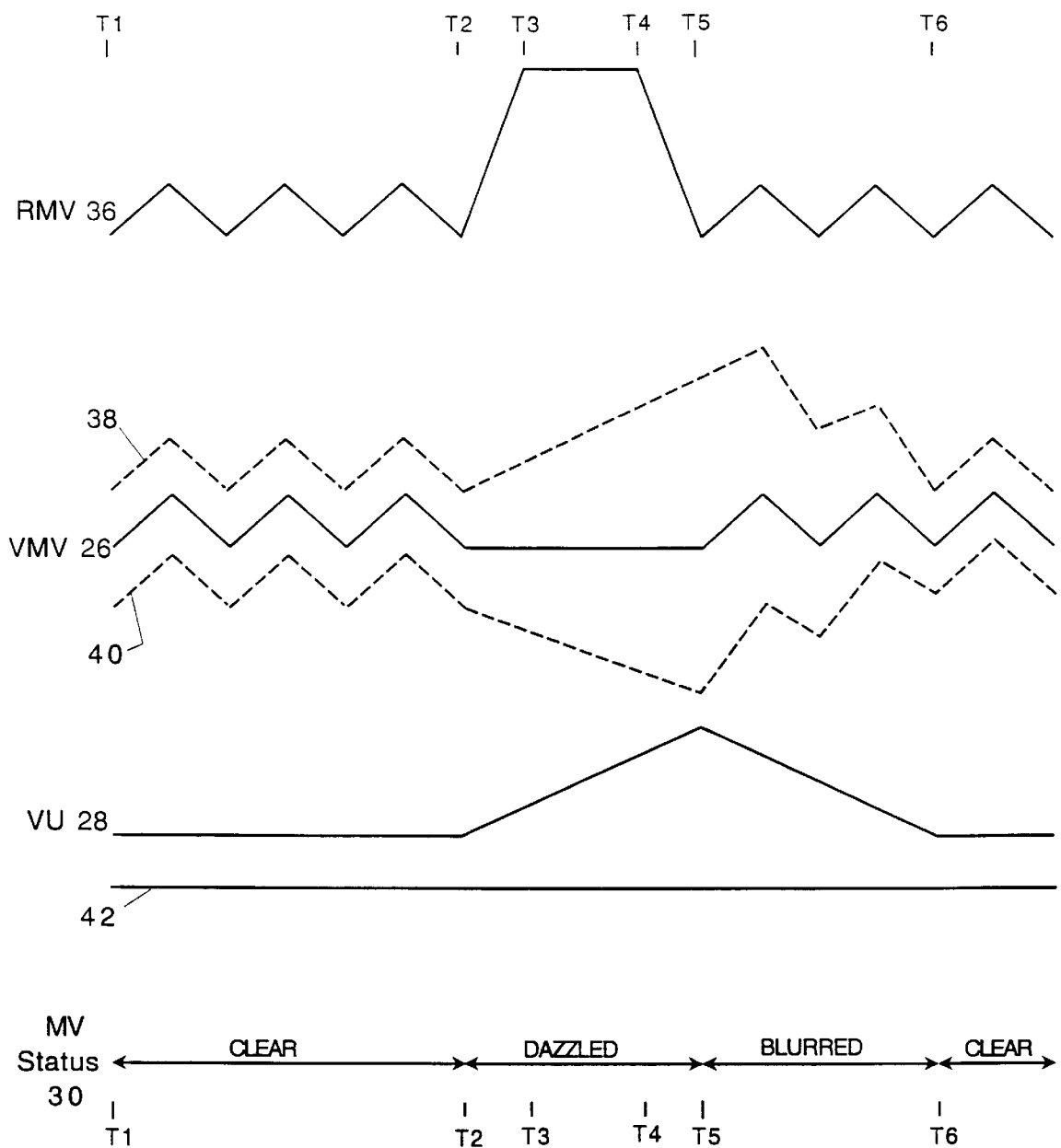
FIG. 5 is a composite graph of various signals produced by the sensor of FIG. 2 versus time.

FIG. 5 illustrates an example of the relationship between VMV 26, VU 28, MV status 30, and RMV 36. In another aspect, FIG. 5 illustrates a preferred method of displaying the relationship between VMV 26 and VU 28 both during normal operation and when a fault has occurred: VU 28 is shown both as a separate signal and as an envelope surrounding VMV 26 (line 38 indicates the sum of VMV 26 and VU 28 and line 40 indicates the difference between VMV 26 and VU 28). When VU 28 is expressed as an envelope surrounding VMV 26, a user can, by examining the envelope, visually determine the range of probable values of the parameter represented by VMV 26 for any displayed time.

In the region between time T1 and time T2, RMV 36 is a periodic signal whose amplitude falls within an expected range. In this region, VMV 26 equals RMV 36, MV status 30 is CLEAR, and VU 28 remains at a constant "normal" level that corresponds to RU 62, the uncertainty under normal operating conditions (with line 42 representing a zero value for VU 28). For purposes of this example, RU 62 is assumed to have a constant value.

At time T2, RMV 36 begins to increase at a rate that substantially exceeds an expected rate of change for RMV 36. Transmitter 24 takes a number of actions in response to this unexplained phenomenon. First, transmitter 24 changes MV status 30 to DAZZLED. Next, transmitter 24, which is basing VMV 26 and VU 28 on short term past performance values in this example, maintains VMV 26 at the value that VMV 26 had just before the sudden increase in RMV 36 at time T2. Finally, transmitter 24 begins to increase VU 28 at a constant rate that equals the maximum rate of increase of VMV 26 during normal operation. The progressive increase in the value of VU 28 over time reflects increasing uncertainty of the value of the measurement in the absence of up to date valid transducer data caused by sensor 12 being DAZZLED.

RMV 36 continues to increase until time T3. At time T3, RMV 36 stops increasing and remains at a constant level. Because the value of RMV 36 now exceeds expected values, transmitter 24 does not change VMV 26 or MV status 30, and continues to increase VU 28 at a constant rate. At time T4, RMV 36 begins to decrease. Because the value of RMV 36 still exceeds expected values, transmitter 24 makes no changes to VMV 26 or MV status 30, and continues to increase VU 28 at a constant rate.

At time T5, RMV 36 begins to operate as expected. In response, transmitter 24 changes MV status 30 to BLURRED and begins to merge VMV 26 with RMV 36 using, for example, the following equation:

$$VMV_{n+1} = 0.95 * VMV_n + 0.05 * RMV_{n+1}$$

where $VMV_{n+1}$ is the value of VMV 26 for the current sample, $VMV_n$ is the value of VMV 26 generated in the previous sample, and $RMV_{n+1}$ is the value of RMV 36 for the current sample. Next, transmitter 24 initializes a recovery timeout period. Finally, transmitter 24 begins to decrease VU 28 by merging VU 28 with RU 62 using, for example, the following equation:

$$VU_{n+1}^2 = 0.95^2 * VU_n^2 + 0.05^2 * RU_{n+1}^2$$

where $VU_{n+1}$ is the value of VU 28 for the current sample, $VU_n$ is the value of VU 28 generated in the previous sample, and $RU_{n+1}$ is the value of RU 62 for the current sample.

At time T6, transmitter 24 determines that the recovery timeout period has expired and changes MV status 30 to CLEAR. Because transmitter 24 now has nominal confidence in RMV 36, transmitter 24 sets VU 28 equal to RU 62.

If, at time T5, RMV 36 had not returned to expected levels, sensor 12 would have either maintained MV status 30 as DAZZLED or diagnosed a sensor fault and changed MV status 30 to BLIND. MV status 30 can only be DAZZLED for a limited "timeout" period. Thus, if RMV 36 remained at unexpected levels, the timeout period would eventually expire, and transmitter 24 would change MV status 30 to BLIND.

As shown in FIG. 3, transmitter 24 uses several sources of information, each of which is discussed below, in generating VMV 26, VU 28, MV status 30, device status 32, diagnostic information 34, and alarm data 35. Raw data 44, the basic measurement information available to transmitter 24, is typically an electrical image of the output of one or more transducers 22 (e.g., the frequency of oscillation or the resistance of a transducer 22). Raw data 44 contains the maximum information available about the response of transducer 22 and is therefore a rich source of information for statistical tests to detect sensor faults. However, knowledge of expected process behavior cannot be applied readily to raw data 44 and is more appropriately applied to statistics based on RMV 36.

Because RMV 36 directly relates to a process parameter (e.g., temperature or mass flow rate), transmitter 24 can link the expected (no-fault) behavior of RMV 36 to the expected behavior of the process parameter associated with RMV 36. Transmitter 24 derives RMV 36 from raw data 44 by conventional processing. For example, if raw data 44 corresponds to the resistance of a transducer 22 and RMV 36 corresponds to temperature, transmitter 24 derives RMV 36 based on raw data 44 in light of known effects of temperature on the resistance of transducer 22. Often, transmitter 24 filters RMV 36 to reduce the effect of sensor noise and high frequency process disturbances. When filtering occurs, RMV 36 contains less information than raw data 44.

To a certain extent, raw data 44 and RMV 36 are complementary sources of information. While raw data 44 has more information content than RMV 36, RMV 36 is more easily compared with expected process behavior. Thus, raw data 44 and RMV 36 each offer useful information to transmitter 24.

Auxiliary data 46 is provided by auxiliary signals within sensor 12. Auxiliary signals, though not directly related to raw data 44 or RMV 36, give useful information about the health or performance of sensor 12. For example, statistical tests to identify characteristic sensor or process behavior may be associated with particular auxiliary signals. Examples of auxiliary signals include the electrical properties of components within sensor 12 (e.g., signal levels at the input or output stages of power amplifiers) and hardware error information 50. Hardware error information 50 is a special, preprocessed form of auxiliary information generated by digital components within sensor 12, requiring little or no processing or interpretation. For example, a memory checksum error in a memory component of transmitter 24 would constitute hardware error information 50.

In addition to information from within sensor 12 or from process 14, transmitter 24 uses information from data control and management system 16 in generating output signals. Data control and management system 16 is known as the "Next Level Up" ("NLU"), and information from data control and management system 16 is known as NLU information 48. A difficulty associated with having transmitter 24 validate the output of sensor 12 is that transmitter 24 may have insufficient information to reach a valid conclusion. For example, transmitter 24 may be unable to distinguish between certain types of sensor faults (e.g., drift errors that cause the output of the sensor to change over time for a given input) and legitimate process changes. In these situations, transmitter 24 may refer to NLU information 48 for clarification. Data control and management system 16, which has access to additional information, including data from other sensors 12, provides transmitter 24 with the information needed to distinguish between process changes and sensor drift.

Transmitter 24 may request NLU information 48 such as anticipated process limits through standard requests to data control and management system 16. Alternatively, data control and management system 16 can provide unsolicited information, such as indications of changes in process behavior that will change the process parameters being measured by transducers 22, to transmitter 24. For example, if process 14 operates in a number of phases that each have distinct characteristics, data control and management system 16 can notify transmitter 24 when the phase of process 14 changes.

Application knowledge base information 52 allows transmitter 24 to estimate a "wear and tear" effect on sensor performance. Application knowledge base information 52 describes the relationship between signals and sensor characteristics over time. In some applications, sensors are known to degrade much more rapidly under certain conditions (e.g., at extremes of their operating range). For example, if a normal range pH probe is exposed to more than about 12pH for as little as an hour, the probe may become alkali-conditioned and fail to respond when the solution becomes more acidic. Application knowledge base information 52 also includes factors such as the time elapsed since the last calibration or last maintenance of sensor 12.

Sensor/process stimulus information 54 provides information about a known stimulus applied to the process or part of a sensor. Sensor/process stimulus information 54 is used in implementing procedures for testing sensor 12. A known stimulus is applied to process 14 or sensor 12 and the response generated by sensor 12 is compared with an expected response. For example, sensor/process stimulus information 54 could describe a known force that has been introduced to a pressure transducer. Sensor/process stimulus information 54 is generated by transmitter 24 (i.e., as part of a self-test initiated by transmitter 24) or sent by data control and management system 16 as NLU information 48. When testing disables the measuring capability of sensor 12, transmitter 24 sets the MV status 30 of each disabled measurement to DAZZLED, bases VMV 26 and VU 28 on past performance, and sets device status 32 to TESTING.

FIG. 3 also shows the functional units of transmitter 24. A diagnostic state machine 56 processes all of the information available to transmitter 24 and determines the diagnostic state 58 of sensor 12. Diagnostic state 58 is the central piece of information used by diagnostic state machine 56 in deriving VMV 26, VU 28, MV status 30, and device status 32. Because diagnostic state 58 may itself be helpful to users performing maintenance on sensor 12, it is the basis of diagnostic information 34, which is output upon a request by data control and management system 16.

Figure 6:
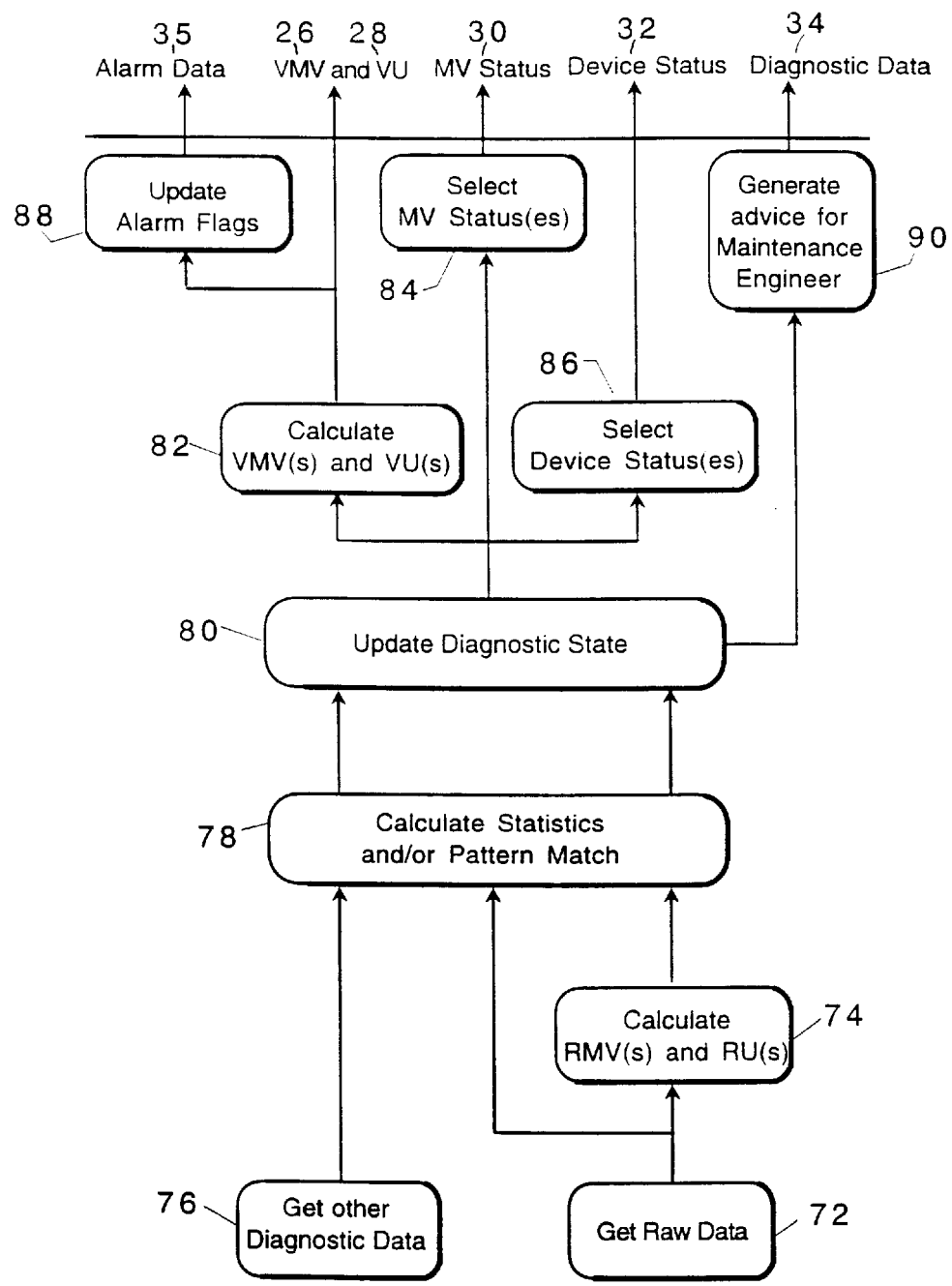
FIG. 6 is a block diagram showing the timing of information flow in the sensor of FIG. 2.

Referring also to FIG. 6, transmitter 24 performs the following operations during each sampling period. After getting raw data 44 from transducer 22 (step 72), diagnostic state machine 56 propagates raw data 44 through a set of device equations 60 to generate RMV 36 (step 74). At the same time, transmitter 24 dynamically calculates RU 62 using an uncertainty analysis 64 based on device equations 60 and calibration data 66 in accordance with the established standards discussed above (step 74). In calculating RU 62, transmitter 24 assumes that no fault has occurred. RU 62 has a non-zero value under all operating conditions. Generally, RU 62 increases under other than ideal conditions.

Next, diagnostic state machine 56 obtains other information (step 76) and, based on the other information, raw data 44, RMV 36, and RU 62, calculates statistics or performs pattern matching to determine if sensor 12 is operating correctly (step 78). Based on the results of step 78, diagnostic state machine 56 updates diagnostic state 58 (step 80).

Next, diagnostic state machine 56 modifies (68) RMV 36 based on diagnostic state 58 to produce VMV 26. Essentially, diagnostic state machine 56 recalculates RMV 36 after modifying the parameters used in the calculation to account for diagnostic state 58 and sets VMV 26 equal to the new RMV 36 (step 82). Thus, under normal operating conditions (when diagnostic state 58 does not require modification of any parameters), VMV 26 typically equals RMV 36.

At the same time, diagnostic state machine 56 modifies (70) RU 62 based on diagnostic state 58 to produce VU 28. As with VMV 26, diagnostic state machine 56 recalculates RU 62 after modifying the parameters used in the calculation to account for diagnostic state 58 and sets VU 28 equal to the new RU 62 (step 82). Thus, VU 28 typically equals RU 62 under normal operating conditions. Under other conditions, VU 28 typically exceeds RU 62.

Next, diagnostic state machine 56 selects MV status 30 (step 84) and device status 32 (step 86) based on diagnostic state 58 and via either calculations or a lookup table. If necessary, diagnostic state machine 56 sends alarm data 35 by updating alarm flags (step 88). Also, if data control and management system 16 has requested it, diagnostic state machine 56 generates diagnostic information 34 based on diagnostic state 58 (step 90).

Figure 7:
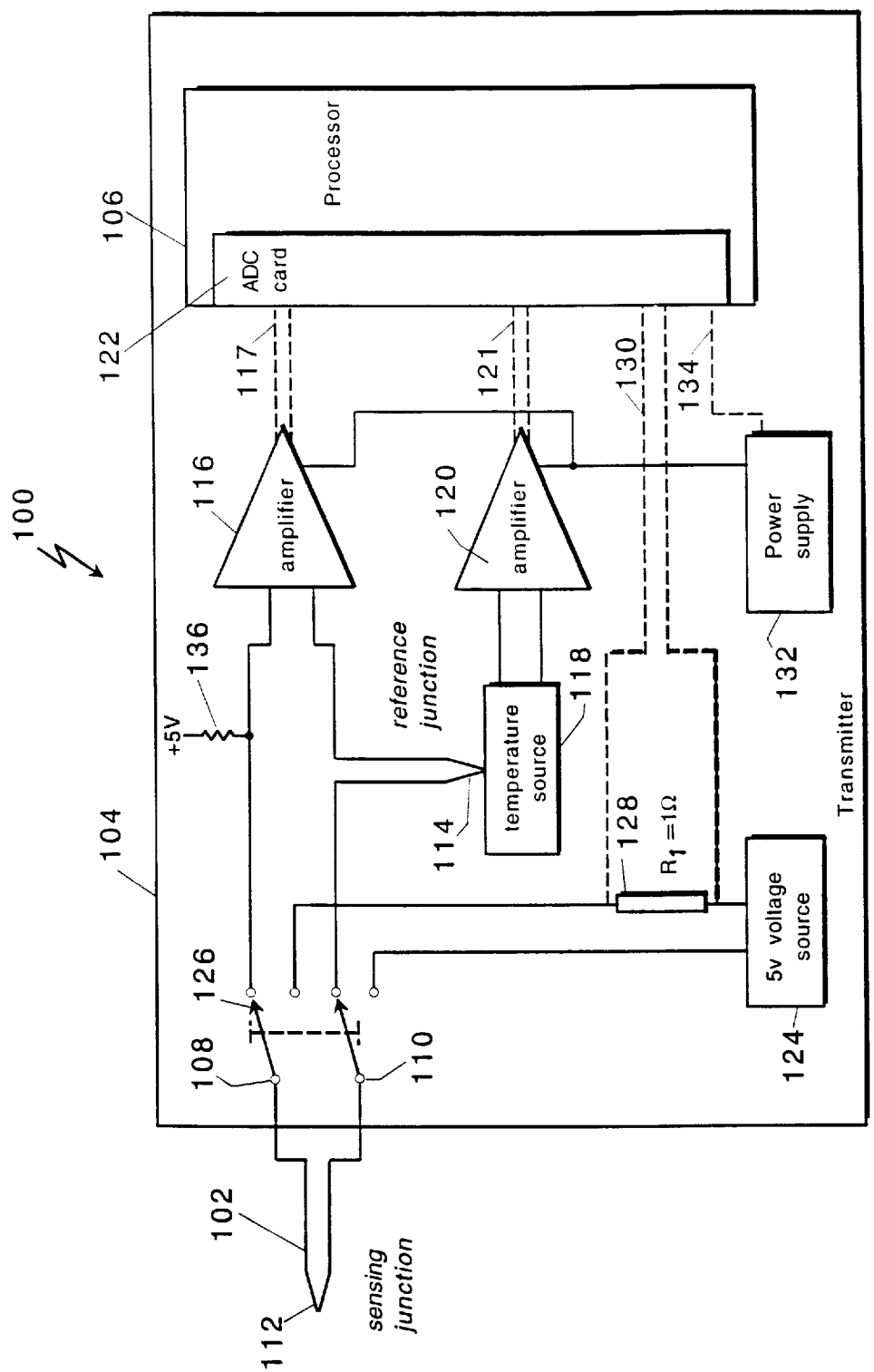
FIG. 7 is a block and schematic diagram of a temperature sensor according to the invention.

Referring to FIG. 7, a self-validating temperature sensor 100 includes a thermocouple 102 and a transmitter 104 that includes a processor 106. Typically, thermocouple 102 includes two dissimilar metals in contact and produces a voltage, $V_{Diff}$, between two terminals 108 and 110. $V_{Diff}$ is proportional to the difference between the temperature of a sensing junction 112 and a reference junction 114. The sum of $V_{Diff}$ and $V_{Comp}$, a voltage proportional to the difference between the temperature of reference junction 114 and zero degrees, equals $V_{Temp}$, a voltage proportional to the difference between the temperature of sensing junction 112 and zero degrees. To determine $V_{temp}$, $V_{diff}$ is amplified by amplifier 116 and $V_{comp}$ is generated by temperature sensor 118 and amplified by amplifier 120. The output 117 of amplifier 116 and the output 121 of amplifier 120 are then supplied to an analog-to-digital convertor ("ADC") 122 in processor 106. Processor 106 uses amplifier outputs 117, 121, and other available information, to generate diagnostic state 58, RMV 36, and RU 62. Based on these signals, processor 106 generates VMV 26, VU 28, MV status 30, device status 32, alarm data 35, and, when requested, diagnostic information 34.

Figure 8:
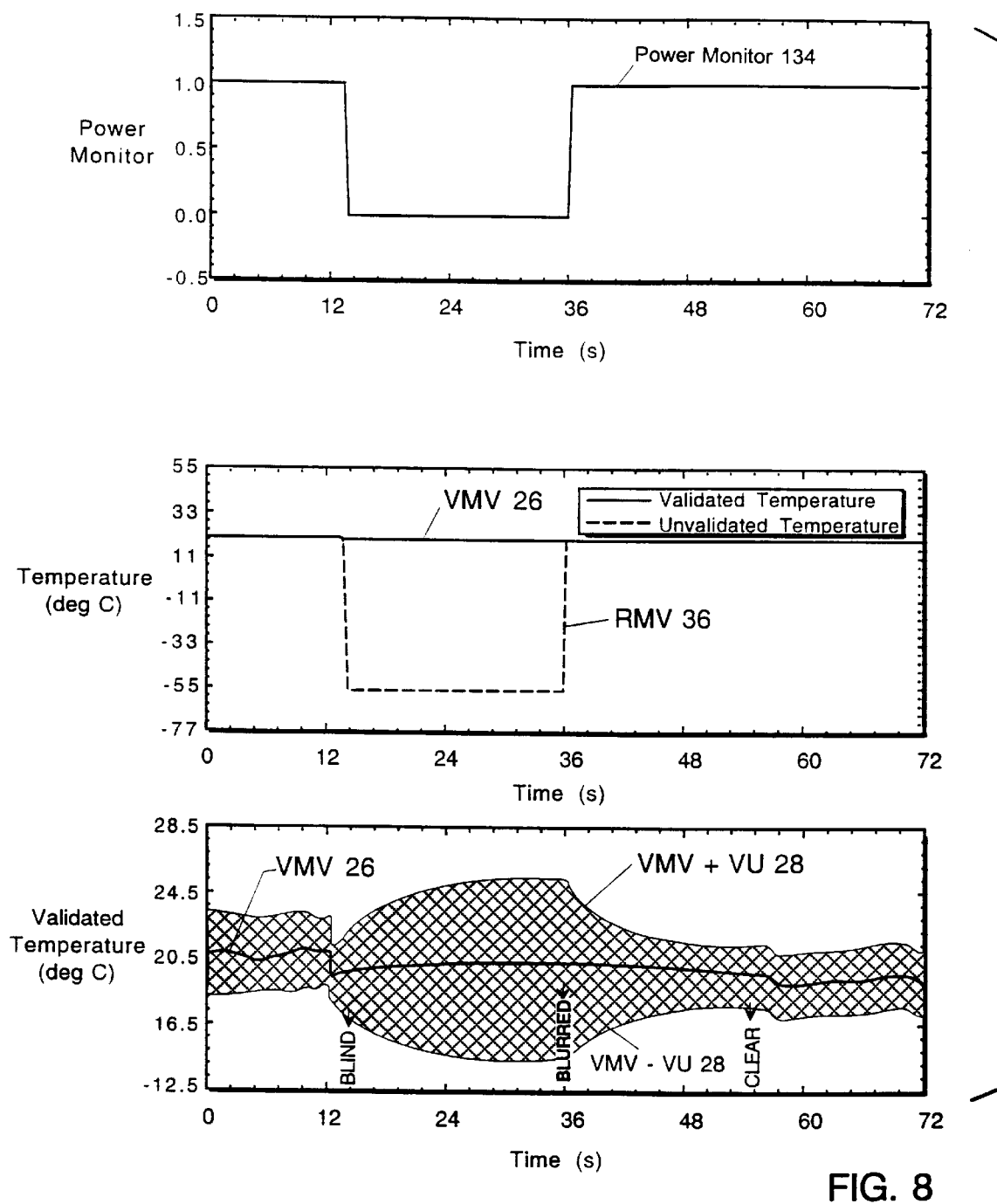
FIG. 8 is a set of composite graphs of an auxiliary signal (upper graph), raw temperature (middle graph), and validated temperature and uncertainty (lower graph) versus time for the instrument of FIG. 7.

Referring to FIG. 8, self-validating temperature sensor 100 responds to a loss of power to amplifiers 116, 120 as described below. During normal operation (time 0 to 15), VMV 26 equals RMV 36, which processor 106 generates based on the sum of outputs 117, 121. Similarly, VU 28 equals RU 62, and indicates the uncertainty of VMV 26. MV status 30 is CLEAR.

At time 15, the power supply 132 stops functioning and $V_{Diff}$ and $V_{Comp}$ (outputs 117, 121) both go to zero volts, which results in an RMV 36 of about negative 55° C. (for a particular transmitter design). Processor 106 detects the loss of power when power monitor 134, a digital auxiliary signal, switches from one to zero in response to the loss of power. Processor 106 then sets diagnostic state 58 to indicate that processor 106 has zero confidence in RMV 36. As a result, processor 106 sets VMV 26 and VU 28 to a combination of the long and short term past values for VMV 26 and VU 28 respectively as described above. Finally, processor 106 signals the severity and expected long term duration of the sensor fault by setting MV status 30 to BLIND.

When the power supply is restored at time 36, processor 106 detects the change in power monitor 134 from zero to one and sets MV status 30 to BLURRED. The "live" data from RMV 36 is merged with the previous value of VMV 26 as described above to give a new value for VMV 26. Similarly, RU 62 is merged with the previous value of VU 28 to give a decreasing value for VU 28. At this time, processor 106 also initializes a recovery timer.

Processor 106 generates VMV 26 and VU 28 by merging past values of VMV 26 and VU 28 with, respectively, RMV 36 and RU 62 until the recovery timer expires at time 56. (In this example, the recovery timer was set for 20 seconds.) At that time, processor 106 sets MV status to CLEAR, sets VMV 26 equal to RMV 36, and sets VU 28 equal to RU 62.

Figure 9:
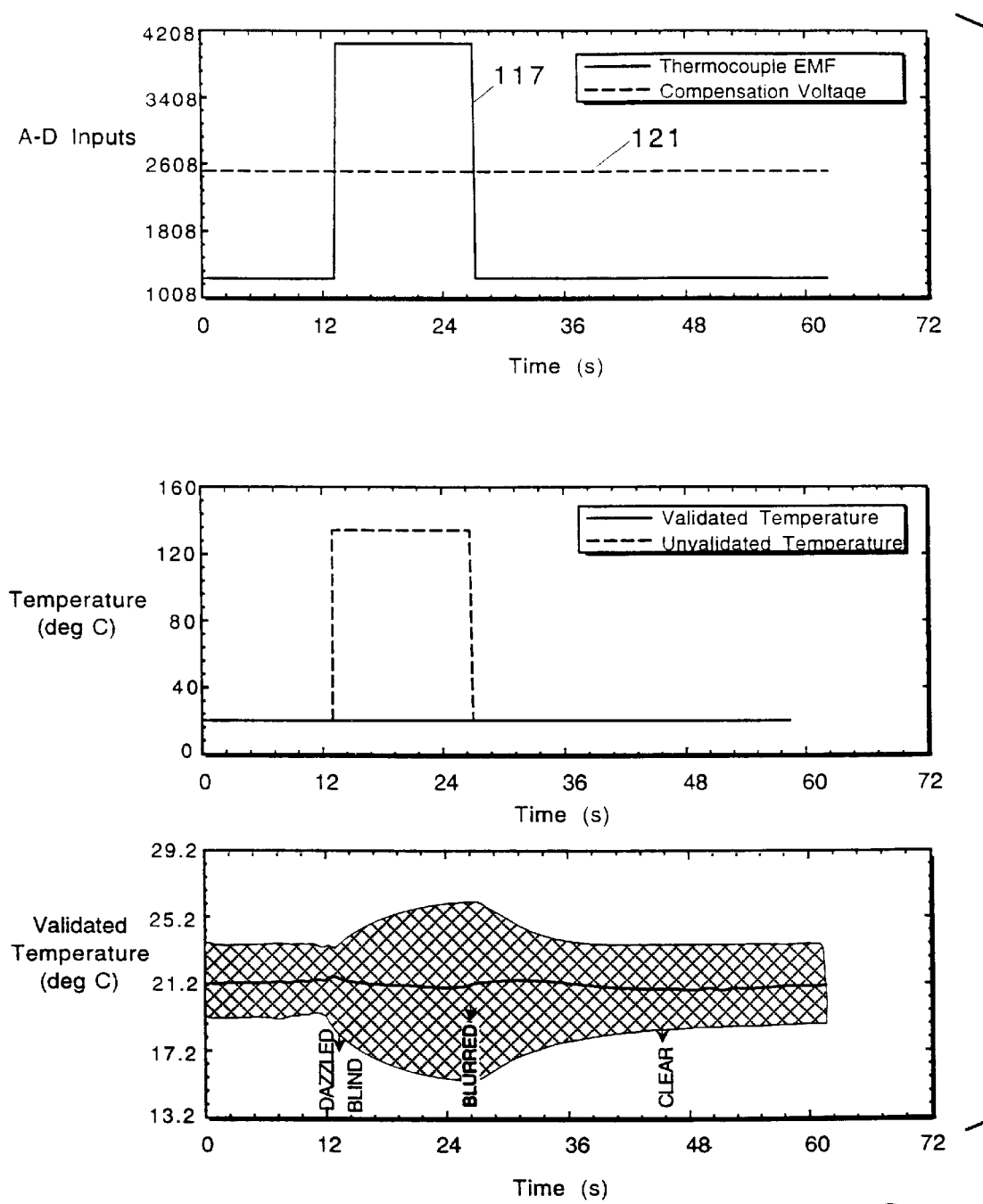
FIG. 9 is a set of composite graphs of raw data (upper graph), raw temperature (middle graph) and validated temperature and uncertainty (lower graph) versus time for the instrument of FIG. 7.

Referring now to FIG. 9, an open circuit fault occurs at time 13 when thermocouple 102 is disconnected from transmitter 104. In the presence of such a fault, RMV 36 is around 130° C., which corresponds to a normal value for output 121 but an abnormally high value for output 117 due to saturation of amplifier 116. (Pull-up resistor 136 causes saturation of amplifier 116 in the presence of an open circuit fault.) In response to the abnormally high value of output 117, processor 106 sets diagnostic state 58 to indicate zero confidence in RMV 36 and sets MV status 30 to DAZZLED. Processor 106 then generates VMV 26 and VU 28 based on a combination of the long and short term past values as described above.

Next, referring again to FIG. 7, processor 106 connects thermocouple 102 to voltage source 124 via switch 126 and monitors the voltage 130 produced across a resistor 128. Because of the open circuit, no current flows in resistor 128 and voltage 130 is zero volts. From this, processor 106 confirms the open circuit fault and sets MV status 30 to BLIND.

At time 27, the open circuit fault is corrected and output 117 returns to a normal value. Processor 106 responds by setting diagnostic state 58 to indicate reduced confidence in RMV 36 (rather than no confidence), sets MV status 30 to BLURRED, and initializes a recovery timer.

Thereafter, processor 106 generates VMV 26 and VU 28 by merging past values of VMV 26 and VU 28 with, respectively, RMV 36 and RU 62 until the recovery timer expires at time 47 (where the recovery timer was set for 20 seconds). At that time, processor 106 sets MV status to CLEAR, sets VMV 26 equal to RMV 36, and sets VU 28 equal to RU 62.

Referring to FIG. 7, a loss of contact fault occurs when sensing junction 112 loses contact with the process element of which the temperature is being measured. Because a loss of contact fault does not produce an abnormal change in RMV 36, sensor 100 cannot readily detect the fault.

As a result, sensor 100 uses current injection tests to detect loss of contact faults. In a current injection test, sensor 100 connects thermocouple 102 to voltage source 124 for a predetermined period and measures the effect on output 117. (The value of output 117 before thermocouple 102 is connected to voltage source 124 is compared to the value after disconnection.)

Figures 1, 10:
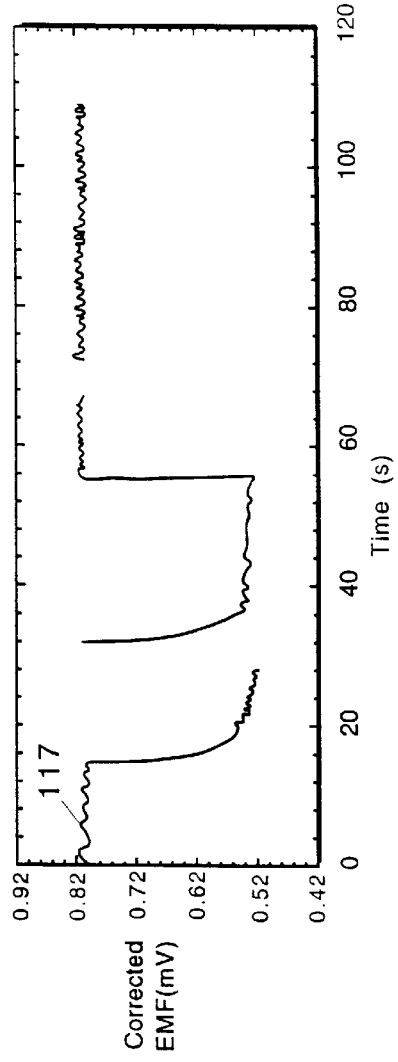
Figures 2, 10:
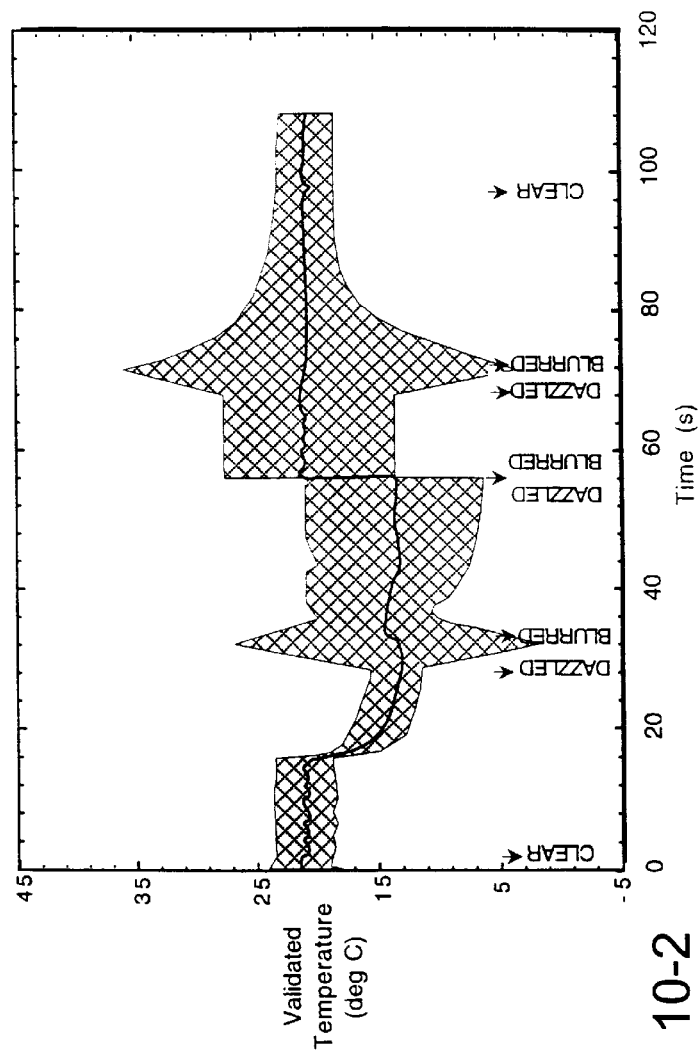

Referring to FIG. 10, a loss of contact fault occurs at time 12 and the measured temperature drops by about seven degrees. Because this is within normal operating parameters, sensor 100 does not immediately recognize the fault, and, instead, adjusts VMV 26 and maintains MV status 30 as CLEAR.

At time 28, processor 106 begins a current injection test. Because amplifier 116 does not read "live" data during the test, processor 106 sets MV status 30 to DAZZLED and generates VMV 26 and VU 28 based on past performance as discussed above. At time 33, processor 106 determines that the fault has occurred and sets MV status 30 to BLURRED. (Processor 106 assumes that, though contact has been lost, the temperature sensed by thermocouple 102 still approximates the actual temperature.)

At time 56, contact is reestablished. However, processor 106 interprets the sudden change in output 117 as a spike and temporarily sets MV status 30 to DAZZLED. When output 117 remains at the increased value, processor 106 sets MV status 30 back to BLURRED. (Processor 106 does not set MV status 30 to CLEAR because processor 106 has not detected the removal of the fault condition.)

At time 66, processor 106 begins another current injection test and sets MV status 30 to DAZZLED. At time 72, processor 106 determines that contact has been reestablished and, in response, sets MV status to BLURRED and initializes a recovery timer. At time 97, the recovery timer (which was set to 25 seconds) expires and processor 106 sets MV status to CLEAR.

Figure 11:
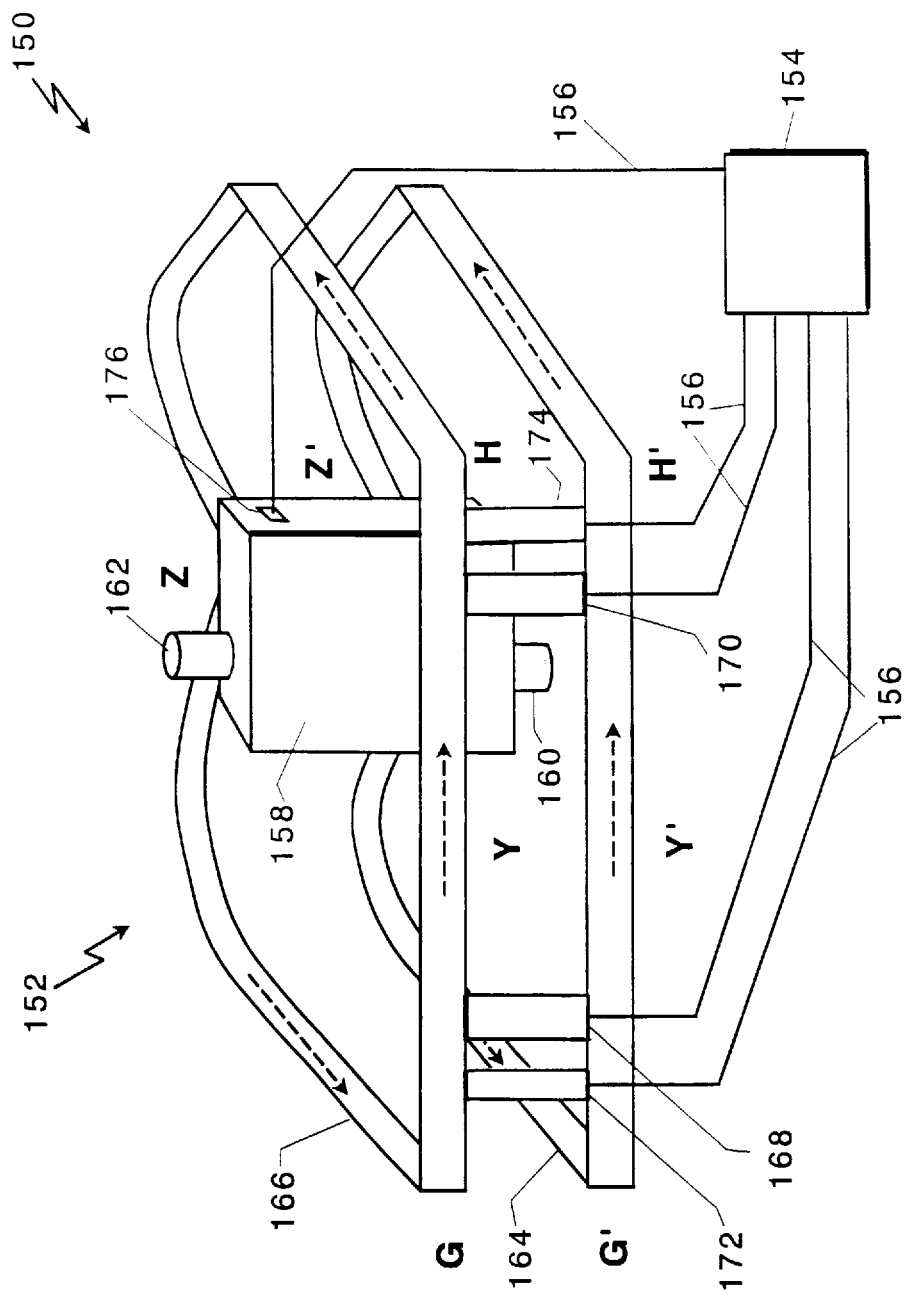
FIG. 11 is a schematic and block diagram of a Coriolis flow meter.
Figures 2, 15A:
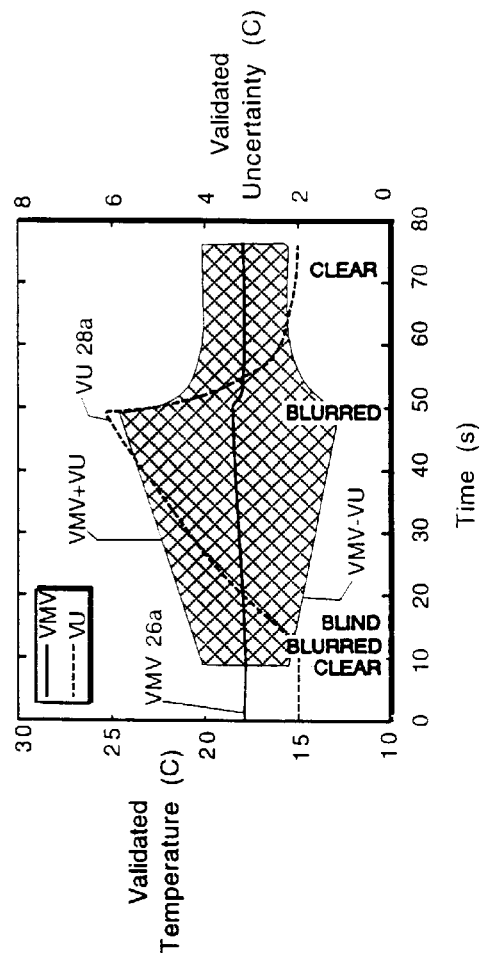
Figures 1, 15A:
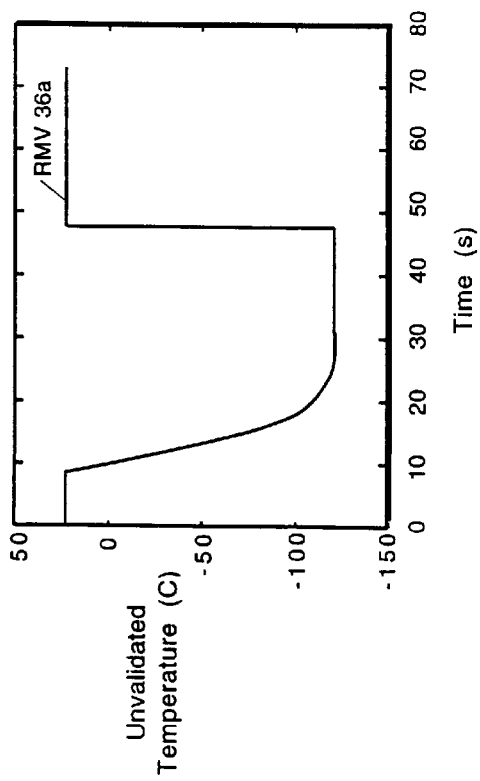
Figures 1, 15B:
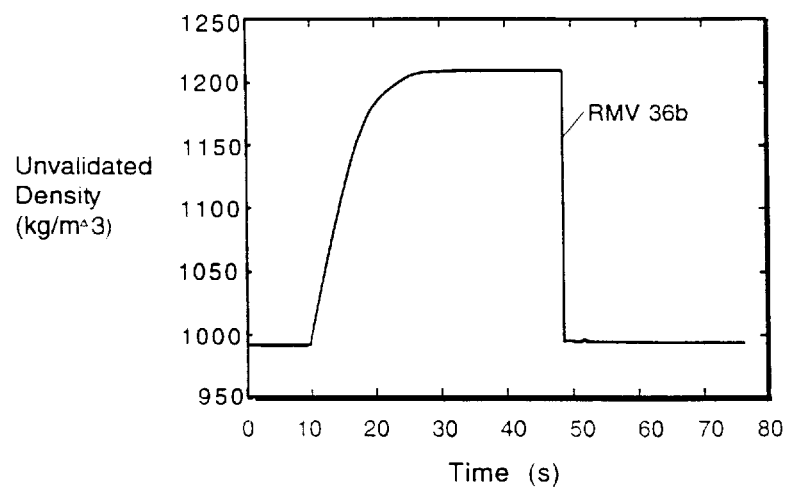
Figures 2, 15B:
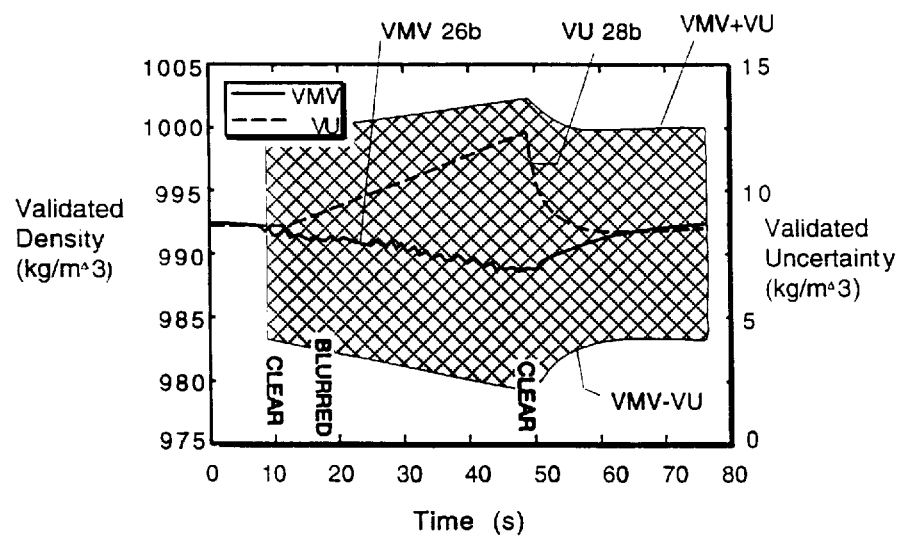
Figures 1, 15C:
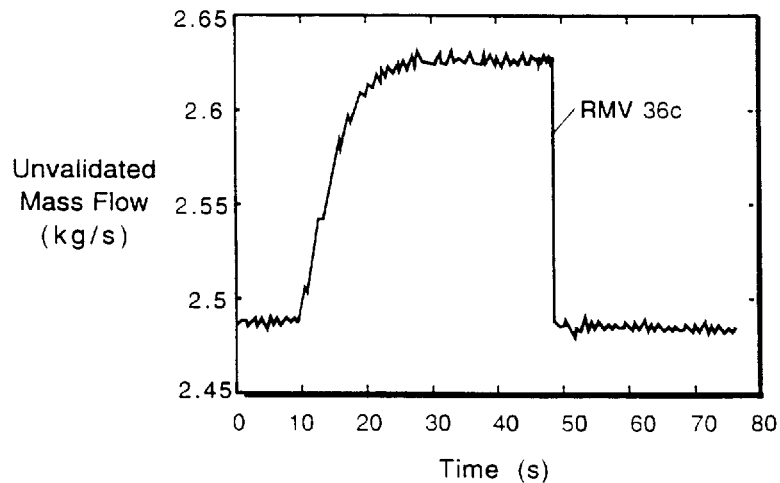
Figures 2, 15C:
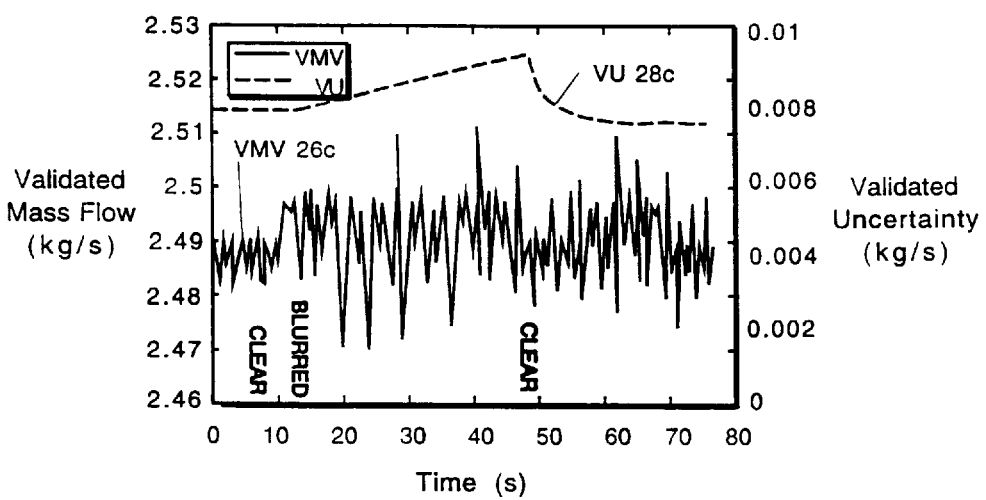

Referring to FIG. 11, another example of a self-validating sensor according to the invention is a Coriolis flow meter 150. Flow meter 150 measures three process parameters: mass flow rate, density, and temperature. Mass flow is measured directly using the principle of Coriolis acceleration, without needing to rely on external pressure, temperature, or specific gravity measurements.

Structurally, flow meter 150 consists of a flowtube 152 that is connected to a transmitter 154 by cables 156. Flowtube 152 includes a body 158 to which is connected an input pipe 160 and an output pipe 162. Two parallel pipe loops 164, 166 extend from body 158. Body 158 contains passages which lead a process fluid from input pipe 160 to the beginning of loop 164, from the end of loop 164 to the beginning of loop 166 and from the end of loop 166 to output pipe 162 (the broken arrows in FIG. 11 show the direction of flow in loops 164, 166).

Transmitter 154 causes loops 164, 166 to pivotally oscillate about their axes of symmetry Y'-Z' and Y-Z by supplying anti-phase sinusoidal signals to electromagnetic drivers 168, 170. Transmitter 154 uses feedback to maintain the signals to drivers 168, 170 at the resonant frequency of loops 164, 166. Transmitter 154 then detects movement of loops 164, 166 via sensors 172, 174, which each produce a voltage that is proportional to the instantaneous velocity between loops 164, 166. Transmitter 154 adjusts the amplitude of the signals to drivers 168, 170 to maintain the average amplitude of the voltages produces by sensors 172, 174 at a constant level.

Transmitter 154 measures mass flow rate, density, and temperature in the following manner. First, transmitter 154 measures the mass flow rate of the process fluid by monitoring the effect of Coriolis forces on loops 164, 166. Coriolis forces acting on sections G'-H' and G-H of oscillating loops 164, 166 cause deflections of loops 164, 166. These deflections result in a phase angle difference between the voltages produced by sensors 172, 174 that is proportional to the mass flow rate. Next, transmitter 154 determines the density of the process fluid from the frequency of oscillation of loops 164, 166 (which equals the frequency of the signals supplied to drivers 168, 170). The density of the process fluid is inversely proportional to the square of the drive frequency. Finally, transmitter 154 measures the temperature of the process fluid via a temperature sensor 176 located in body 158. Typically, temperature sensor 176 is an RTD device with a resistance that is temperature dependent.

In the context of flow meter 150, the raw data available are the frequency 44c of a signal coming out of temperature sensor 176 (the frequency is proportional to the resistance of temperature sensor 176), frequency 44b of the drive signals applied to drivers 168, 170, and the voltage outputs 44c of sensors 172, 174. From these signals, transmitter 154 derives three RMs: the temperature of the process fluid 36a, the density of the process fluid 36b, and the mass flow rate 36c (derived from the phase angle between the sensor signals). In addition, transmitter 154 performs uncertainty analyses to produces three RUs (62a, 62b, 62c), each indicating the uncertainty of a corresponding RMV 36.

After generating RMVs 36a–c and RUs 62a–c, transmitter 154 determines the diagnostic state 58 of flow meter 150. This determination is based on raw data 44a–c, RMVs 36a–c, RUs 62a–c, and auxiliary data 46. Based on diagnostic state 58, transmitter 154 adjusts the parameters used in calculating RMVs 36a–c and RUs 62a–c and recalculates these values. Transmitter 154 then outputs the recalculated RMVs 36a–c and RUs 62a–c as VMVs 26a–c and VUs 28a–c. Transmitter 154 also outputs a MV status 30a corresponding to temperature, a MV status 30b corresponding to density, and a MV status 30c corresponding to mass flow rate. Finally, transmitter 154 outputs a single device status 32 corresponding to the status of flow meter 150.

Referring again to FIG. 6, the procedure performed by transmitter 154 during each sample period can be implemented in software. The software may be implemented on any processor that supports a structured programming language. In an alternative approach, the procedure could be implemented using hard-wired circuitry.

The pseudocode shown in FIG. 12 provides a simplified view of the procedure performed by transmitter 154 during each sample period. FIG. 12 also shows, in parentheses, the steps performed in FIG. 6 that correspond to the steps in FIG. 12. Initially, transmitter 154 gets raw data 44a–c from flowtube 152 (step 200). Transmitter 154 then calculates RMVs 36a–c and RUs 62a–c (steps 202–206). The pseudocode for calculating RMV 36a and RU 62a is shown in FIG. 13 and is discussed below. Next, transmitter 154 examines all available information (step 208) and determines diagnostic state 58, MV statuses 30a–c, and device status 32 (step 210). A portion of the pseudocode for determining diagnostic state 58 and MV statuses 30a–c is shown in FIG. 14 and discussed below. Based on diagnostic state 58, transmitter 154 corrects the parameters used in calculating RMV 36a–c and RU 62a–c (step 212). Transmitter 154 then calculates VMVs 26a–c and VUs 28a–c (steps 214–218) using the procedure with which RMVs 36a–c and RUs 62a–c were calculated and corrected parameters.

Referring to FIG. 13, transmitter 154 calculates RMV 36a and RU 62a as follows. First, transmitter 154 calculates the resistance "R" of temperature sensor 176 (step 250). Transmitter 154 then calculates the uncertainty "$d_{13}$ R" of R based on an uncertainty analysis of the equation used to calculate R (step 252). Next, transmitter 154 calculates "temperature" (step 254), and sets RMV 36a equal to temperature. Finally, transmitter 154 calculates the uncertainty "$d_{13}$ temperature" of temperature (step 256), and sets RU 62a equal to $d_{13}$ temperature. Thus, as a first pass RMV 36a and RU 62a equal the measured temperature and its corresponding uncertainty. If transmitter 154 subsequently determines that it has less than nominal confidence in RMV 36a and RU 62a, transmitter 154 modifies any of the parameters, uncertainties, and/or raw data (e.g., RK1, d_RK1, f_RTD) used in calculating temperature and d_temperature to reflect the impact of an expected fault. Transmitter 154 then reperforms the procedure illustrated in FIG. 13 using the modified information and sets VMV 26a and VU 28a equal to the new values for temperature and d_temperature. Alternatively, if transmitter 154 determines that the fault is too severe, transmitter 154 may set VMV 26a and VU 28a based on historical data.

FIG. 14 illustrates the procedure used by transmitter 154 to detect and respond to a loss of input from temperature sensor 176. Transmitter 154 maintains a variable, RTD_input_state, that indicates the current status of the input from temperature sensor 176. As a first step, transmitter 154 checks RTD_input state (step 300).

If RTD_input_state equals RTD_INPUT_OK, which indicates that the input from temperature sensor 176 was functioning normally during the previous sample period, transmitter 154 checks the resistance of temperature sensor 176 (step 304). If the resistance is less than 80 ohms, this indicates that the connection between transmitter 154 and temperature sensor 176 has been lost. In response, transmitter 154 sets RTD_input_state to RTD_INPUT_LOST (step 306). Transmitter 154 then checks the value of RTD_spike_state, which indicates whether transmitter 154 had sensed a spike in the output from temperature sensor 176 during the previous sample (step 308). If RTD_spike_state indicates that a spike had occurred, transmitter 154 resets RTD_input_state to indicate no spike (step 310). (A spike is a less serious fault and is mooted by the loss of connection.)

If RTD_input_state equals RTD_INPUT_LOST, transmitter 154 checks the resistance of temperature sensor 176 (step 314). If the resistance is less than 100 ohms (step 314), this indicates that connection with temperature sensor 176 is still lost. (Different resistance values are used in steps 304 and 314 to avoid intermittent switching of RTD_input_state if, for example, the resistance fluctuates between 79 and 81 ohms.) If connection is lost, transmitter 154 sets MV status 30a, which corresponds to temperature, to BLIND (step 316) and substitutes historical information (step 318) about temperature for use in the recalculation steps (steps 214–18 of FIG. 12). Because density and mass flow are based, in part, on temperature, transmitter 154 sets MV statuses 30b–c to BLURRED (steps 320–22). If the resistance is greater than 100 ohms, transmitter 154 sets RTD_input state to RTD_INPUT_RECOVER, to indicate that connection has been reestablished (step 326). At this time, transmitter 154 initializes a recovery timer by setting RTD_input_count equal to zero (step 328).

If RTD_input_state equals RTD_INPUT_RECOVER, transmitter 154 merges the past and present values for temperature as discussed above (step 332). Transmitter 154 then checks to see if the recovery timeout period has expired (step 334). If it has, transmitter 154 sets RTD_input_state to RTD_INPUT_OK (step 336). If it has not, transmitter 154 sets MV status 30a to BLURRED (step 340) and increments RTD_input_count (step 342).

FIG. 15 illustrates the response of flow meter 150 to a loss of input from temperature sensor 176. At time 9, the loss of input occurs and the unvalidated temperature measurement, RMV 36a, begins to rapidly drop. At time 10, transmitter 154 sets diagnostic state 58 to indicate that a spike in the temperature input has occurred, and, in response, changes MV status 30a to DAZZLED, modifies VMV 26a and VU 28a based on past performance as discussed above, and leaves MV statuses 30b–c, VMVs 26b–c, and VUs 28b–c unchanged (though, because density and mass flow rate are partially dependent on temperature, VMVs 26b–c and VUs 28b–c include the changes to VMV 26a and VU 28a).

At time 12, the resistance of temperature sensor 176 drops sufficiently low that transmitter 154 sets diagnostic state 58 to indicate that a loss of temperature input has occurred, and, in response, changes MV status 30a to BLIND, continues to base VMV 26a and VU 28a on past performance, changes MV statuses 30b–c to BLURRED, and leaves VMVs 26b–c unchanged. Because the uncertainties of density and mass flow are based in part on the uncertainty of temperature, VUs 28b–c will increase to reflect the increase in VU 28a.

At time 48, the resistance of temperature sensor 176 increases to a sufficient level so that transmitter 154 sets diagnostic state 58 to indicates that temperature input has been recovered, and, in response, changes MV status 30a to BLURRED, initializes a recovery timer, begins merging past and present values for VMV 26a and VU 28a, and changes MV statuses 30b–c to CLEAR.

At time 72, the recovery timer expires, and transmitter 154 sets diagnostic state 58 to indicate that the temperature input is fully recovered, and, in response, changes MV status 30a to CLEAR and bases VMV 26a and VU 28a on RMV 36a and RU 62a.

Referring to FIG. 16, in summary, a sensor 12 according to the invention implements a procedure 350. The sensor receives a data signal related to the value of a variable (step 352), and, based on the data signal, estimates a measurement of the variable (step 354). Thereafter, the sensor generates a first output signal (step 356), which can be related to the estimated measurement of the variable. Finally, the sensor performs an uncertainty analysis on the first output signal (step 358) and generates a second output signal based on the uncertainty analysis (step 360).

Referring to FIG. 17, and as discussed above, a sensor according to the invention may respond to the detection of a fault according to a procedure 400. Initially, the sensor determines whether the occurrence of a fault has been detected in the source of a measurement (step 405). For example, as shown in FIG. 18 and discussed above, when the sensor includes a temperature transducer, the sensor may detect a loss of contact fault using a procedure 500. The sensor stores an output of the temperature transducer (step 505) and connects the temperature transducer to a voltage source for a predetermined time period (step 510). After the predetermined time period expires, the sensor compares the stored output with the current output of the temperature transducer (step 515) and indicate that a loss of contact fault has been detected based on the comparison (step 520).

Referring again to FIG. 17, if the occurrence of a fault has been detected (step 405), the sensor produces a first estimate of the measurement (step 410). The first estimate may be a mean value of the measurement during a time interval that includes a short term past value of the measurement. For example the time interval may include a value of the measurement immediately prior to the occurrence of the fault. The sensor also produces an uncertainty measure for the first estimate (step 415). Initially, the uncertainty measure may indicate that the measurement can have any value observed for the measurement during the time interval. The sensor may also account for a reduction in reliability of the first estimate due to a time difference between the current time and a time at the end of the time interval. In particular, the sensor may adjust the uncertainty measure for the first estimate by multiplying the time difference between the current time and the time at the end of the time interval by a maximum observed between the current time and the time at the end of the time interval by a maximum observed rate of change of the measurement. The sensor then produces a second estimate (step 420) and a related uncertainty measure (step 425) using the approach described above for the first estimate and uncertainty measure. The second estimate may be based on long term past values of the measurement.

The sensor combines the multiple estimates of the measurement to produce a combined estimate for the measurement (step 430). The sensor may combine the estimates by weighting the estimates according to their associated uncertainty measures. In particular, the sensor may multiply the first estimate by the second uncertainty measure squared divided by a sum of the second uncertainty measure squared and the first uncertainty measure squared and add a result of this multiplication to a result of multiplying the second estimate by the first uncertainty measure squared divided by a sum of the second uncertainty measure squared and the first uncertainty measure squared:

$$ESTCOM = \frac{U12}{U12 * U22} * EST1 + \frac{U22}{U12 + U22} * EST2.$$

The sensor also combines uncertainty measures for each of the multiple estimates to produce an uncertainty measure for the combined estimate for the measurement (step 435). The sensor may do so by multiplying the second uncertainty measure by the first uncertainty measure an dividing a result of the multiplication by a square root of a sum of the second uncertainty measure squared and the first uncertainty measure squared:

$$UCOM = \frac{U1 * U2}{(U12 + U22)\ 1/2}$$

Finally, the sensor provides the combined estimate for the measurement as a value for the measurement at a current time (step 440 and the uncertainty measure for the combined estimate as an indication of the validity of the value of the measurement of the current time (step 455).

Figure 19A:
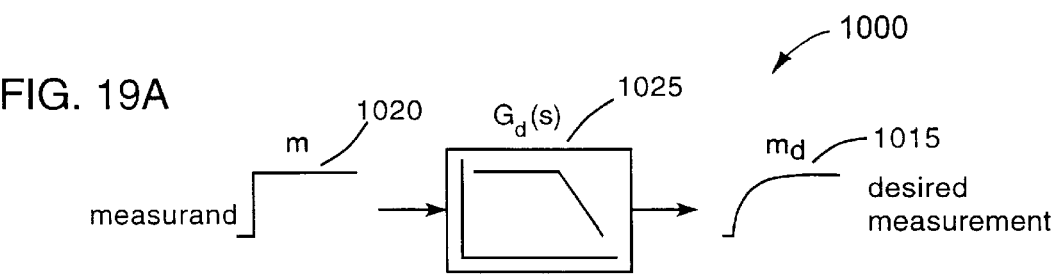
FIGS. 19A–19D are block diagrams illustrating an ideal measurement system and a process for producing a modified measurement.
Figure 19B:
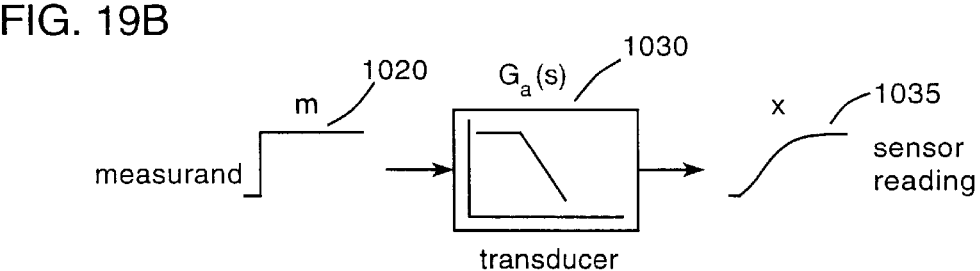

The sensor also may correct for a fault after identifying the fault. Referring to FIG. 19A, if the sensor 100 were an ideal measurement system 1000, then a desired measurement $m_d$ 1015 produced by the system 1000 would be related to a measurand m 1020 by a desired transfer function $G_d(s)$ 1025. However, an actual measurement system, such as is shown in FIG. 19B, may include variations in its transfer function $G_a(s)$ 1030 relative to the desired transfer function $G_d(S)$. These variations may distort the actual sensor output x 1035 (also referred to as the uncompensated measurement $m_u$) relative to the desired measurement $m_d$ 1015. For example, when the desired transfer function $G_d(s)$ is a low-pass filter (FIG. 19A), variations in the actual system may cause the actual transfer function $G_a(s)$ to have a lower cutoff frequency than that of the desired transfer function $G_d(s)$. While some filtering may be necessary to remove measurement noise, the reduced cutoff frequency may be lower than the required measurement bandwidth. This may result in attenuation of high frequency signal components and the introduction of an appreciable lag into the measurement. If the system design does not account for this lag, then the control performance may degrade and a control loop using the sensor 100 may become unstable.

Figure 20:
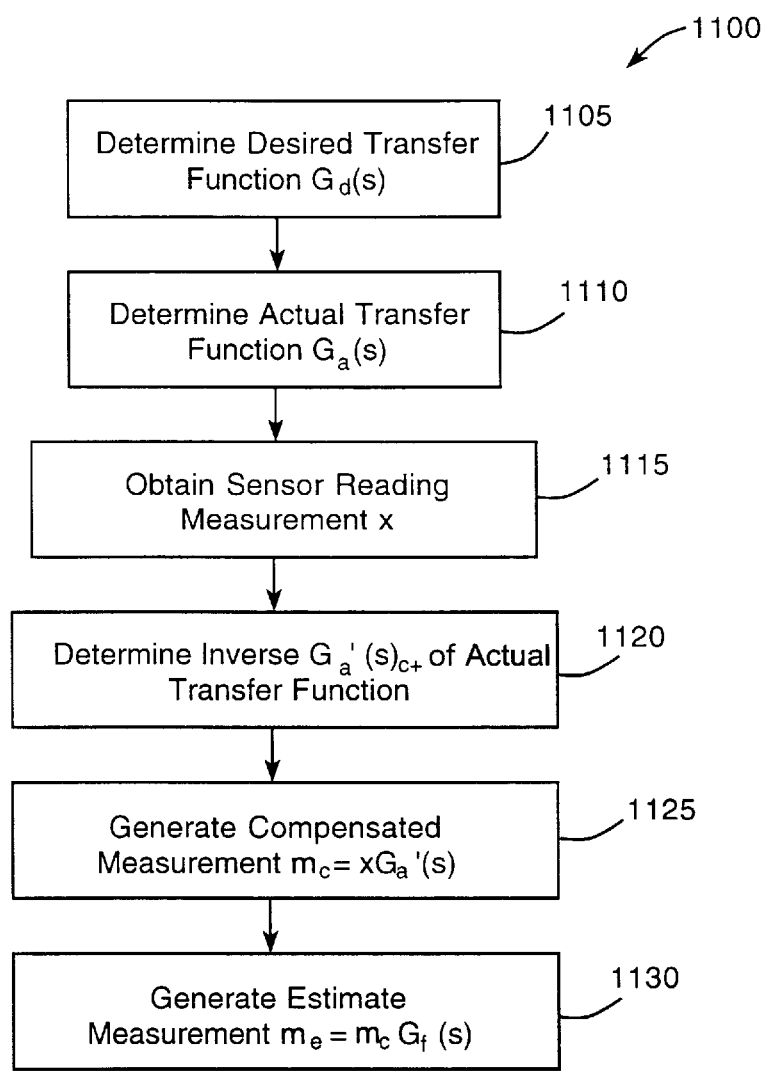
FIG. 20 is a flow chart of a procedure for generating a modified measurement.

Referring to FIG. 20, the processor 106 implements a procedure 1100 to account for the effects of variations between actual and desired transfer functions. Initially, the processor 106 determines the discrete-time equivalent of the desired transfer function $G_d(s)$ 1025 of the sensor 100 (step 1105). Typically, this function is defined in the performance specifications of the sensor. Next, the processor determines the discrete-time equivalent of the actual transfer function $G_a(s)$ 1030 of the sensor 100 (step 1110). For example, when the sensor 100 is a thermocouple, the processor 106 determines the actual transfer function using current injection tests.

Figure 19C:
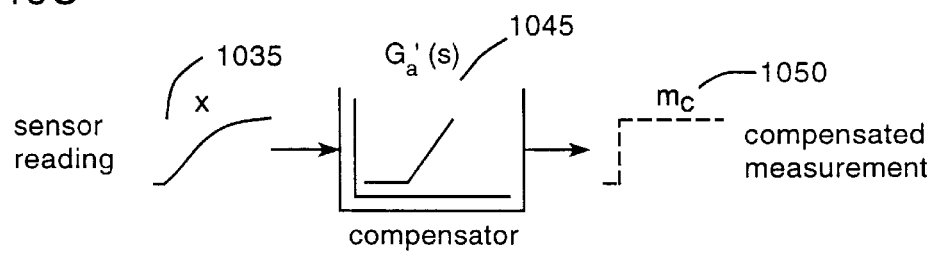

After determining the transfer functions, the processor 106 obtains the sensor reading x 1035 from the sensor 100 (step 1115). Referring also to FIG. 19C, the processor 106 then computes the inverse, $G_a'(s)$ 1045, of the actual transfer function $G_a(s)$ 1030 (step 1120). It should be noted that $G_a'(s)$ is not the exact mathematical inverse of the actual transfer function $G_a(s)$, as compensation using the exact inverse may result in unstable compensated sensor readings. Instead, $G_a'(s)$ is the finite-impulse-response inverse of $G_a(s)$ with matched gain. Using the inverse transfer function $G_a'(s)$ 1045, the processor 106 negates the effect of the sensor's actual transfer function to obtain a compensated measurement $m_c$ 1050 (step 1125):

$$m_c = xG_a'(s).$$

The compensated measurement $m_c$ 1050 is the measurement that would be generated if the sensor had infinite bandwidth. Since the sensor reading x 1035 is:

$$x = mG_a(s),$$

the compensated measurement $m_c$ 1050 corresponds to the measurand m 1020:

$$m_c = xG_a'(s) = mG_a(s)\ G_a'(s) \approx m.$$

Figure 19D:
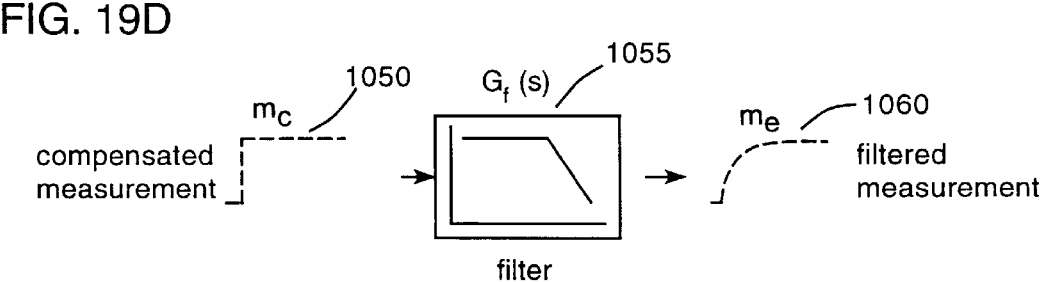

Thereafter, the processor 106 uses a filter $G_f(s)$ 1055 (FIG. 19D) having a transfer function equal to the desired transfer function $G_d(s)$ to filter the compensated measurement $m_c$ 1050 to generate an estimate $m_e$ 1060 of the desired measurement $m_d$ 1015 (step 1130):

$$m_e = m_c G_f(s).$$

Figure 21A:
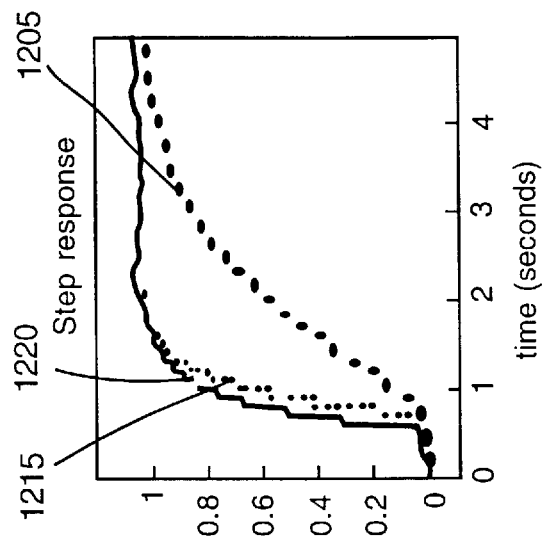
FIGS. 21A and 21B are graphs showing responses to a step input.
Figure 21B:
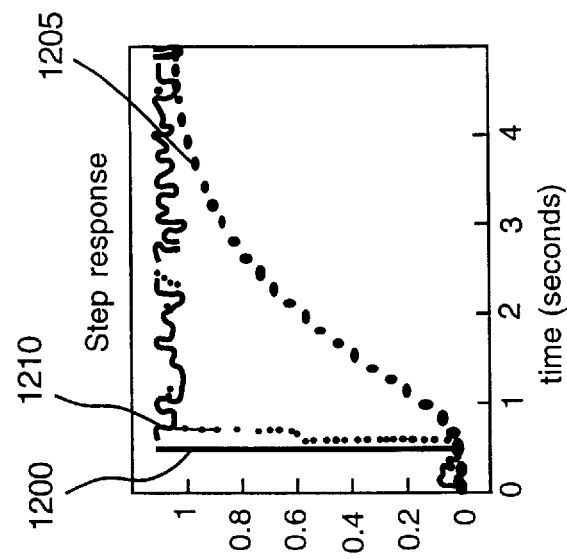

FIGS. 21A and 21B illustrate implementation of a procedure for a system having an actual transfer function with a delay of 0.07 seconds, break frequencies of 0.1768 and 0.2274 Hz:

$$G_a(s) = \frac{e^{-0.07s}}{(1 + 0.7s)(1 + 0.9s)}$$

Ignoring the delay and assuming a sampling rate of 10 Hz, the discrete time, zero-order-hold equivalent of the actual transfer function may be expressed using standard control theory techniques as:

$$G_a(z^{-1}) = \frac{b_1 z^{-1} + b_2 z^{-2}}{1 + a_1 z^{-1} + a_2 z^{-2}} = \frac{0.0072957 z^{-1} + 0.0067035 z^{-2}}{1 - 1.7617 z^{-1} + 0.7757 z^{-2}}.$$

From this, the compensated measurement $m_c$ for a sample k may be expressed using the finite-impulse-response inverse of the discrete time equivalent as:

$$m_c(k) = \frac{x(k) + a_1 x(k-1) + a_2 x(k-2)}{b_1 + b_2} =$$

$$\frac{x(k) - 1.7617 x(k-1) + 0.7757 x(k-2)}{0.0072957 + 0.0067035}.$$

FIG. 21A illustrates the response of the system to a measurand m that is a noise-corrupted delayed step input 1200 having the value:

$$m = H(t - 0.5) + 0.1 N(t)$$

where H(t) is a step input of unit magnitude at time t=0 and N(t) is random noise of normal distribution and unit magnitude. The system responds to the step input 1200 by producing a sensor reading x that is identified as an uncompensated measurement $m_u$ 1205. The compensated measurement $m_c$ 1210 is calculated from the uncompensated measurement using the equation provided above.

FIG. 21A shows that the compensated measurement $m_c$ 1210 resembles the step input 1200 much more closely than does the uncompensated measurement mu 1205. In particular, the uncompensated measurement $m_u$ 1205 is much slower than the step input 1200. However, the uncompensated measurement $m_u$ 1205 is less noisy than both the step input 1200 and the compensated measurement $m_c$ 1210. This is to be expected since high frequency noise in the step input 1200 is filtered out by the relatively slow response of the transducer that produces the uncompensated measurement $m_u$ 1205.

FIG. 21B illustrates the differences between the uncompensated measurement $m_u$ 1205, an estimate $m_e$ 1215 of the desired measurement, and the actual desired measurement $m_d$ 1220. The desired sensor transfer function $G_d(s)$ of the system is a first-order filter with a cutoff frequency of 0.5 Hz:

$$G_d(s) = \frac{1}{1 + 0.32 s}.$$

This cutoff frequency is substantially higher than the break frequencies of the actual transfer function $G_a(s)$.

The discrete-time equivalent of the desired transfer function $G_d(s)$ at a sampling rate of 10Hz may be expressed as:

$$G(z^{-1}) = \frac{c_1 z^{-1}}{1 + d_1 z^{-1}} = \frac{0.2684 z^{-1}}{1 - 0.7316 z^{-1}}.$$

From this, the estimate $m_e$ 1215 of the desired measurement for a sample k may be expressed as:

$$m_e(k) = c_1 m_c(k-1) - d_1 m_d(k-1) = 0.2484 \, m_c(k-1) + 0.7316 \, m_d(k-1).$$

This results in an estimate $m_e$ 1215 that closely tracks the desired measurement $m_d$ 1220.

Figure 22A:
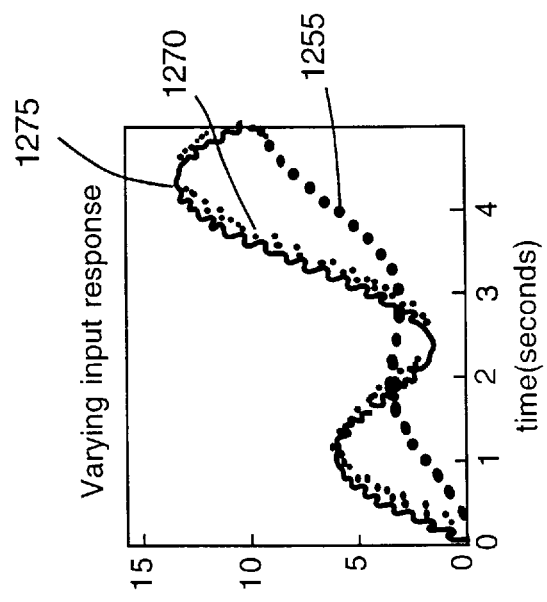
FIGS. 22A and 22B are graphs showing responses to a varying input.
Figure 22B:
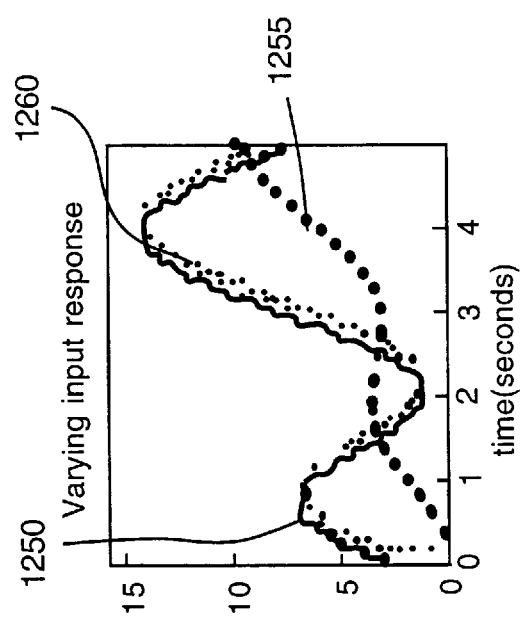

FIGS. 22A and 22B illustrate the response of the system to a measurand m that is a varying input 1250. The varying input 1250 has the value:

$$m = 10\sin(2\pi 0.05 t) + 5\sin(2\pi 0.3 t + 2\pi/10) + 0.1 N(t),$$

where N(t) is random noise of normal distribution and unit magnitude. A primary signal component of the varying input 1250 is at a frequency of 0.3 Hz, which is above the cutoff frequency of the actual transfer function. Accordingly, this signal component is attenuated in the uncompensated measurement $m_u$ 1255, which causes significant distortion therein. By contrast, most of the signal component is restored in the compensated measurement $m_e$ 1260 so that the compensated measurement more closely resembles the varying input 1250. FIG. 22B illustrates the differences between the uncompensated measurement $m_u$ 1255, the estimate $m_e$ 1270 of the desired measurement, and the desired measurement $m_d$ 1275.

The feasibility of the compensation technique is demonstrated by the fact that, in both FIGS. 21B and 22B, the estimated measurement $m_c$ resembles the desired measurement $m_d$ much more closely than does the uncompensated measurement $m_u$.

The technique of the invention can be employed in a variety of circumstances. For example, as shown in FIG. 23A, a thermocouple 1300 may be placed in a thermal well 1305 filled with silicon oil 1310. When the thermal well 1305 is at the same temperature as the process of interest, the response of the thermocouple 1300 to changes in the process temperature is of a second order with time constants governed by the heat transfer properties of the thermocouple/silicon oil interface and the silicon oil/thermal well interface. If, as shown in FIG. 23B, the silicon oil 1310 leaks from the thermal well 1305 or is otherwise lost, the heat transfer characteristics of the thermocouple 1300 becomes less efficient. This causes the time constants in the thermocouple response to increase and the sensor reading x 1035 to become sluggish. A self-validating sensor may compensate for this sluggishness using the techniques discussed above.

Figure 24:
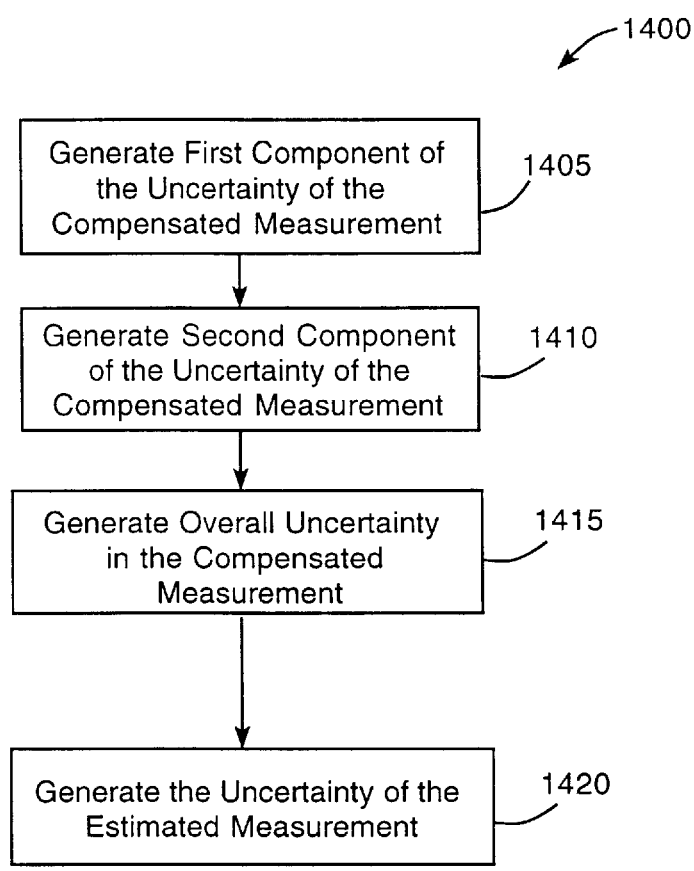
FIG. 24 is a flow chart of a procedure for generating an uncertainty measure for a modified measurement.

Once the estimated measurement $m_e$ has been generated, the uncertainty δ of the estimate may be quantified. Referring to FIG. 24, the processor 106 implements a procedure 1400 to account for the uncertainties of the input signal as well as the inaccuracies introduced by the technique and propagates each uncertainty component appropriately.

As noted above, the compensated measurement $m_c$ may be estimated from the sensor reading x using the finite-impulse-response inverse of the discrete time, zero-order-hold equivalent of the actual transfer function:

$$m_c(z^{-1}) = \frac{1 + a_1 + \ldots + a_n z^{-n}}{b_1 + \ldots + b_n} x(z^{-1}).$$

From this expression, the uncertainty δ of the compensated measurement $m_c$ has two main components. The first component is attributable to uncertainty of the input signal and to the inexactness of the compensation coefficients in the discrete time equivalent of the transfer function. The processor 106 calculates the first component (step 1405) using a standard uncertainty propagation formula:

$$(\delta m_{c1}(k))^2 = \sum_{i=0}^{n} \left( \frac{\partial m_c(k)}{\partial x(k-i)} \delta x(k-i) \right)^2 + \sum_{i=0}^{n} \left( \frac{\partial m_c(k)}{\partial a_i} \delta a_i \right)^2 +$$

$$\sum_{i=0}^{n} \left( \frac{\partial m_c(k)}{\partial b_i} \delta bi \right)^2 = \frac{1}{(b_1 + \ldots + b_n)^2} \left\{ \sum_{i=0}^{n} [a_i \delta x(k-i)]^2 + \sum_{i=0}^{n} x[(k-i)\delta a_i]^2 + \sum_{i=0}^{n} [m_c(k)\delta b_i]^2 \right\},$$

where δ denotes the uncertainty of the variable that it precedes.

The second component of the uncertainty results from the discrete time transfer function being a zero-order-hold equivalent having all of its poles at the at the origin. The processor 106 calculates this component (step 1410) as:

$$\delta m_{c2}(k)=nm_c(k)-[x(k-1)+x(k-2)+\ldots+x(k-n)].$$

Using the two components, the processor 106 determines the overall uncertainty in the compensated measurement for a sample k (step 1415) as:

$$\delta m_c(k) = \sqrt{(\delta m_{c1}(k))^2 + (\delta m_{c2}(k))^2}$$

Finally, the processor 106 determines the uncertainty of the estimated measurement $m_e$ by considering the uncertainties of the compensated measurement $m_c$ and the coefficients of the discrete equivalent of the desired transfer function (step 1420). For a sample k, the estimated measurement may be expressed as:

$$m_e(k) = \sum_{i=1}^{n} c_i m_c(k-i) + \sum_{i=1}^{n} d_i m_e(k-i).$$

From this expression, the processor 106 determines the uncertainty of the estimated measurement $m_e$ as:

$$(\delta m_e(k))^2 = \sum_{i=1}^{n} \left( \frac{\partial m_e(k)}{\partial m_c(k-i)} \delta m_c(k-i) \right)^2 +$$

$$\sum_{i=1}^{n} \left( \frac{\partial m_e(k)}{\partial m_e(k-i)} \delta m_e(k-i) \right)^2 +$$

$$\sum_{i=1}^{n} \left( \frac{\partial m_e(k)}{\partial c_i} \delta c_i \right)^2 + \sum_{i=1}^{n} \left( \frac{\partial m_e(k)}{\partial d_i} \delta d_i \right)^2 =$$

$$\sum_{i=1}^{n} [c_i \delta m_c(k-i)]^2 + \sum_{i=1}^{n} [d_i \delta m_e(k-i)]^2 +$$

$$\sum_{i=1}^{n} [m_c(k-i)\delta c_i]^2 + \sum_{i=1}^{n} [m_e(k-i)\delta d_i]^2$$

For the system discussed above with respect to FIGS. 21A and 21B, the first component of the uncertainty of the compensated measurement $m_c$ is:

$$(\delta m_{c1}(k))^2 = \frac{1}{(b_1+b_2)^2} \{[a_1 \delta x(k-1)]^2 + [a_2 \delta x(k-2)]^2 +$$

$$(x(k-1)\delta a_1)^2 + (x(k-2)\delta a_2)^2 + (m_c(k)\delta b_1)^2 + (m_c(k)\delta b_2)^2\}.$$

The second component of the uncertainty of the compensated measurement $m_c$ is:

$$\delta m_{c2}(k)=2m_c(k)-[x(k-1)+x(k-2)].$$

Accordingly, the uncertainty of the estimated measurement $m_e$ is:

$$(\delta m_e(k))^2=(c\delta m_c(k-1))^2+(d_1\delta m_e(k-1))^2+(m_c(k-1)\,\delta c_1)^2+(m_e(k-1)\delta d_1)^2.$$

Figure 25A:
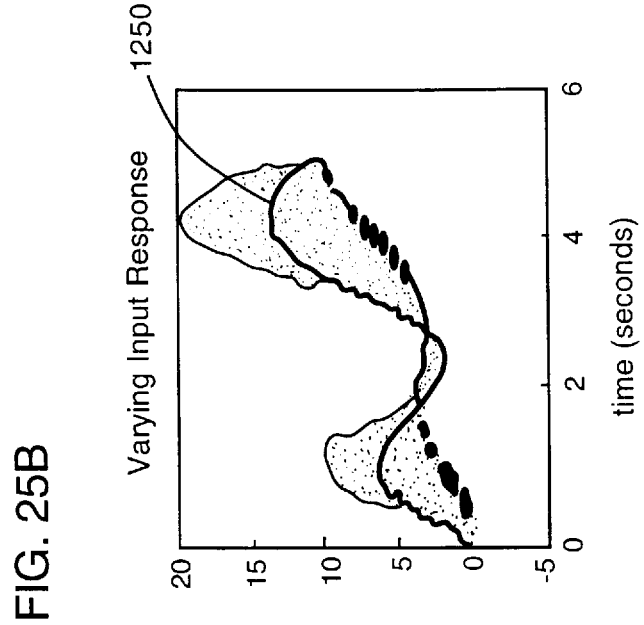
FIGS. 25A and 25B are graphs showing responses to a step input (FIG. 25A) and to a varying input (FIG. 25B).
Figure 25B:
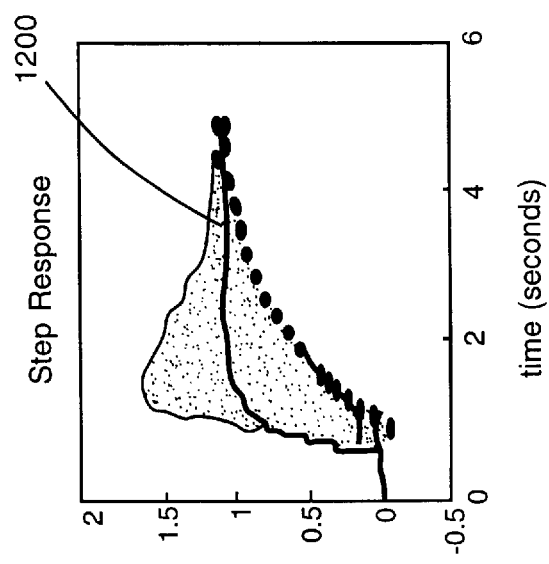

The uncertainties of the estimated measurements $m_e$ for the step input 1200 and the varying input 1250, are shown, respectively, in FIGS. 25A and 25B. The shading indicates the uncertainty δ. For simplicity, the uncertainty of the input signal is ignored, and it is assumed that the filter coefficients are exact. FIGS. 25A and 25B show that the uncertainty estimation technique accounts for the frequency content of the sensor signal and produces a higher uncertainty when the input signal has a significant high frequency component, as is shown in FIGS. 25A and 25B.

In some instances, the processor 106 may need to account for the uncertainty associated with related signals. For example, measurements produced by some sensors may include combinations of different signals that are affected by common variables. This may result in problems because the propagation of uncertainty in standard uncertainty analyses is valid only if the variables are independent.

Figure 26:
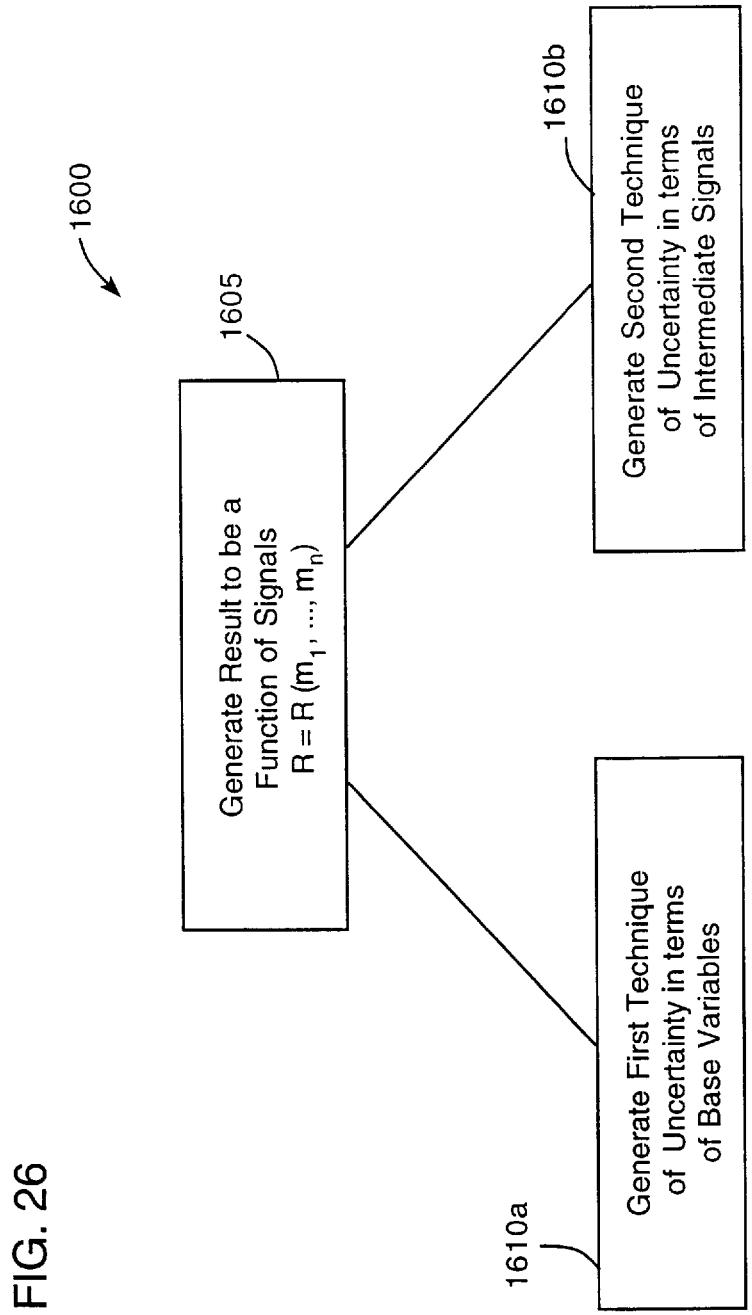
FIG. 26 is a flow chart of a procedure for producing uncertainty measure.

Referring to FIG. 26, the processor 106 implements a procedure 1600 to account for the uncertainty of a result R that is a function of dependent variables. Initially, the processor defines the result R (step 1605) as:

$$R=R(m_1,\ldots M_n),$$

where each of the signals $M_n$ is a functions of common variables c and independent variables v:

$$M_i 32\, M_i(c,v_i),$$

where $$c[c_1, c_2, \ldots, c_p]^T$$

and $$v_i=[V_i^1, V_i^2, \ldots, v_i^{qi}]^T.$$

The processor then calculates the uncertainty of the result R.

In a first technique, the processor calculates the uncertainty in terms of base variables as (step 1610a):

$$(\delta R)^2 = \left( \frac{\partial R}{\partial c_1} \right)^2 (\delta c_1)^2 + \left( \frac{\partial R}{\partial c_2} \right)^2 + \ldots + \left( \frac{\partial R}{\partial c_p} \right)^2 (\delta c_p)^2 +$$

$$\left( \frac{\partial R}{\partial M_1} \right)^2 (\delta M_1)^2 + \left( \frac{\partial R}{\partial M_2} \right)^2 (\delta M_2)^2 + \ldots + \left( \frac{\partial R}{\partial M_n} \right)^2 (\delta M_n)^2$$

where $\delta M_i$, is the uncertainty in $M_i$ if the uncertainties of the common variables $c_p$ are ignored. This illustrates that the uncertainties of the common variables may be evaluated from the final result while the uncertainties of the independent variables may be calculated by considering the intermediate signals.

In a second technique, the processor calculates the uncertainty in terms of intermediate signals as (step 1610b):

$$(\delta R)^2 = \left( \frac{\partial R}{\partial M_1} \right)^2 (\delta M_1)^2 + \left( \frac{\partial R}{\partial M_2} \right)^2 (\delta M_2)^2 + \ldots +$$

$$\left( \frac{\partial R}{\partial M_n} \right)^2 (\delta M_n)^2 +$$

$$\sum_{i=1}^{n}\sum_{j=1(i\neq j)}^{n} \left( \frac{\partial R}{\partial M_i} \cdot \frac{\partial M_i}{\partial c_i} \right)\left( \frac{\partial R}{\partial M_j} \cdot \frac{\partial M_j}{\partial c_i} \right)(\delta c_1)^2 + \ldots +$$

$$\sum_{i=1}^{n}\sum_{j=1(i\neq j)}^{n} \left( \frac{\partial R}{\partial M_i} \cdot \frac{\partial M_i}{\partial c_p} \right)\left( \frac{\partial R}{\partial M_j} \cdot \frac{\partial M_j}{\partial c_p} \right)(\delta c_p)^2$$

In this technique, extra uncertainty terms are required to account for the correlation between the common variables.

The procedure 1600 can be illustrated with reference to the following example, in which:

$$M_1=ax+y,\; M_2=bx+z$$

where x is the only common variable and y and z are independent variables. Suppose the result of the first step (step 1605) is:

$$R=\alpha M_1+\beta M_2$$

Applying the first technique results in:

$$(\delta R)^2 = (\alpha a + \beta b)^2 (\delta x)^2 + \alpha^2 x^2 (\delta a)^2 + \beta^2 x^2 (\delta b)^2 + \alpha^2 (\delta y)^2 + \alpha^2 (\delta z)^2.$$

Applying the second technique results in the same value.

Figure 27A:
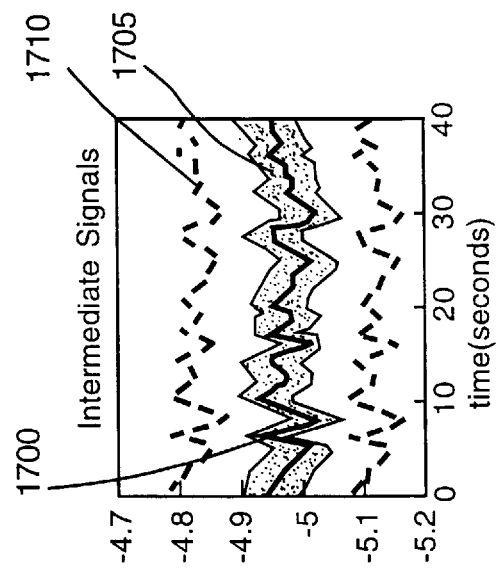
FIGS. 27A and 27B are graphs representing an uncertainty measure in terms of base variables (FIG. 27A) and in terms of intermediate signals (FIG. 27B).
Figure 27B:
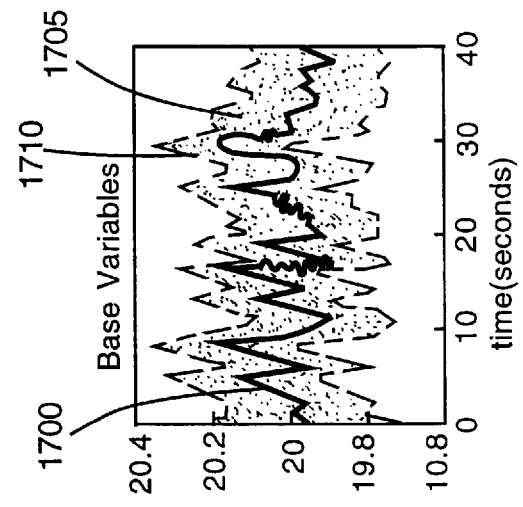

FIGS. 27A and 27B illustrate this result when $\alpha$ and $\beta$ are both 0.5, x has a mean value of 5 and variance of 0.01, y and z vary uniformly between ±0.005, the uncertainty of x, y or z at a particular time is 1% of the value of that variable at that time, and the values of a and b are assumed to be:

a=3, b=5 for the first method, and a=3, b=−5 for the second method.

In the first example, as shown in FIG. 27A, the common variable x acts in common mode on signals $M_1$ and $M_2$ because a and b are of the same sign. In the second example, as shown in FIG. 27B, the common variable x acts in differential-mode because a and b are of opposite signs. In comparing the uncertainties, result R 1700 is shown by the solid line, the uncertainty calculated using the techniques discussed above is shown by the shading 1705, and uncertainty calculated using standard techniques is shown by bounds 1710. For the example shown in FIG. 27B, any inaccuracies in the readings tend to cancel so that the uncertainty 1705 is smaller than the uncertainty 1710 estimated using standard techniques.

Figure 28:
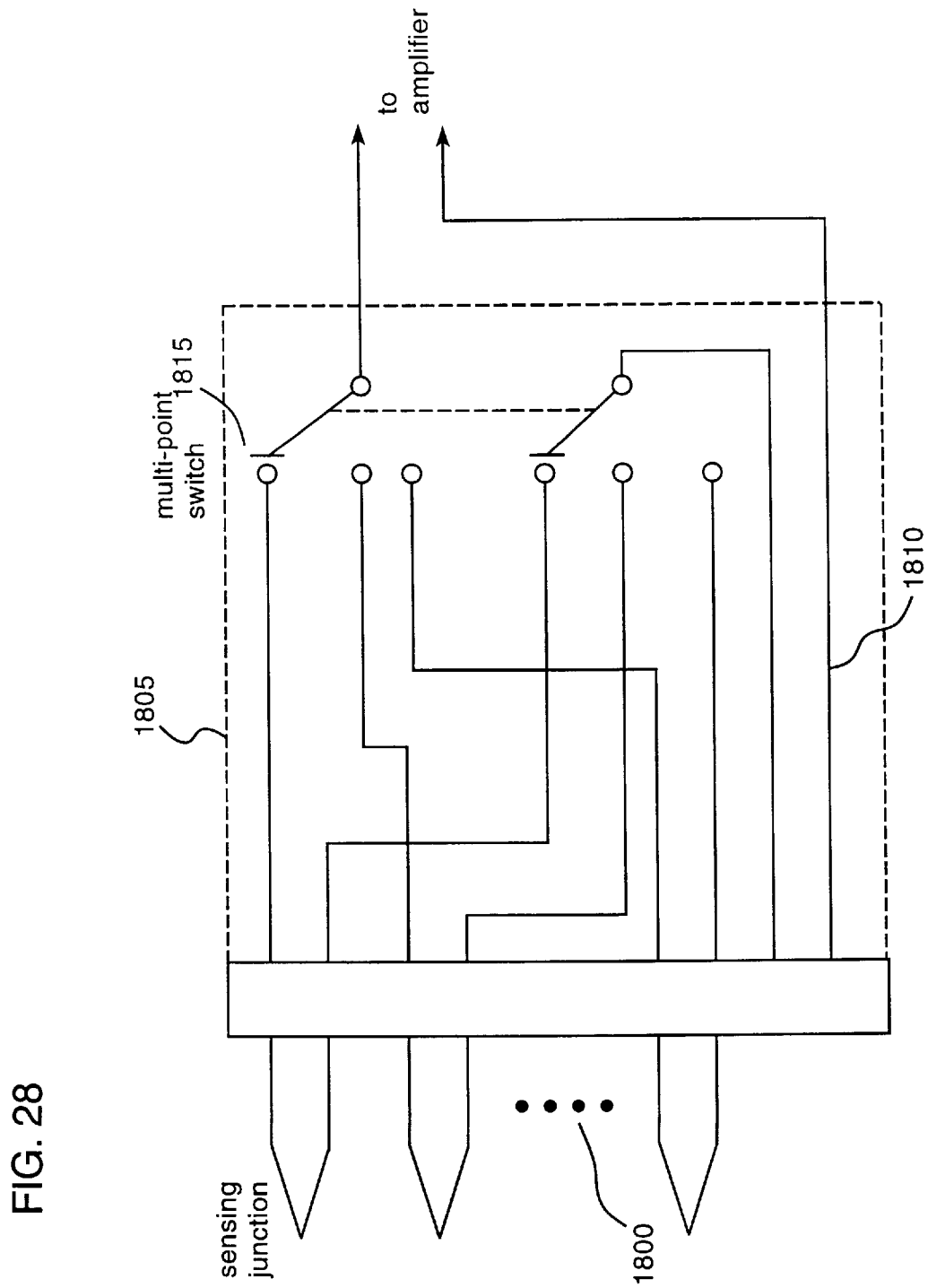
FIG. 28 is a schematic of multiple thermocouples arranged in parallel to measure average temperature.

The technique discussed above may be employed in a variety of circumstances. For example, FIG. 28 illustrates multiple thermocouples 1800 arranged in parallel to measure a spatially averaged temperature. The terminals of all the thermocouples 1800 can be housed together in one terminal box 1805, so that only one measurement of the reference junction temperature 1810, is necessary. A multi-point switch 1815 can be used to poll the different channels in turn to obtain the temperature readings at the different locations, from which the average temperature is calculated. The proposed uncertainty calculation techniques will take into account the correlation of the different channels and adjust the uncertainty of the averaged reading accordingly.

Figure 29:
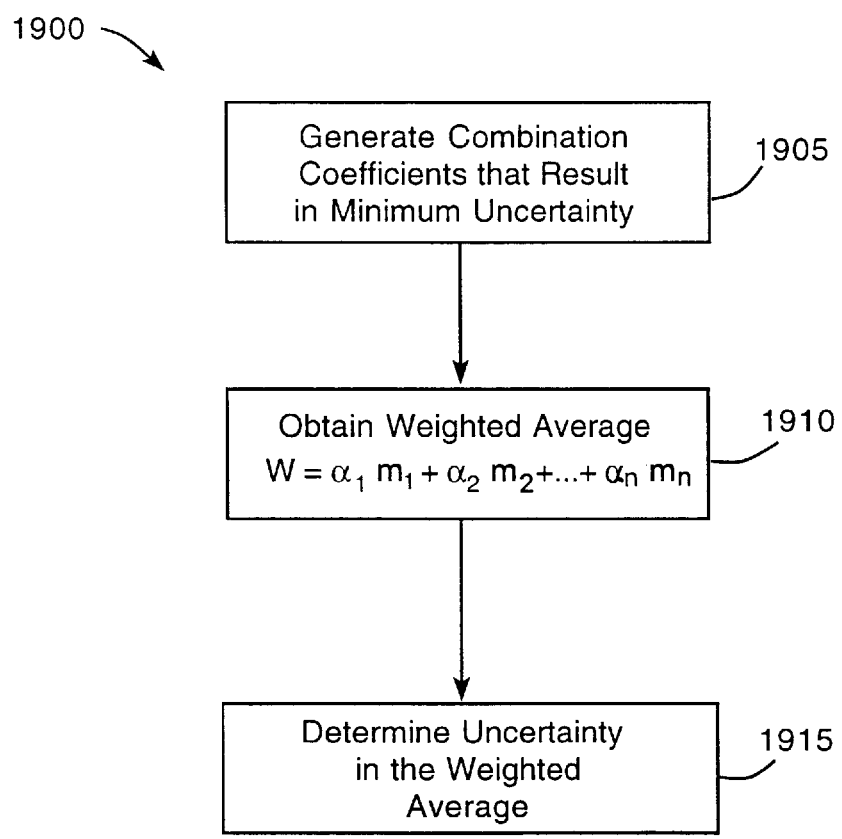
FIG. 29 is a flow chart of a procedure for generating an uncertainty measure.

Referring to FIG. 29, the processor 106 may implement a procedure 1900 to combine similar signals to produce a weighted average R having minimal uncertainty. The processor combines similar signals $M_n$ to give the weighted average result:

$$R = \alpha_1 M_1 + \alpha_2 M_2 + \ldots + \alpha_n M_n$$

where $$\alpha_1 + \alpha_2 + \ldots + \alpha_n = 1.$$

When the signals $M_1$ to $M_n$ are all independent, the ith coefficient may be represented as:

$$\alpha_i = \frac{\frac{1}{(\delta M_i)^2}}{\sum_{j=1}^{n} \frac{1}{(\delta M_j)^2}}$$

where $\delta M_i$ is the uncertainty in $M_i$. However, this expression does not apply when the signals include common variables. Accordingly, if the signals $M_1$ are of the form:

$$M_i = f(c) + f_i(v_i)$$

where $$c = [c_1, c_2, \ldots, c_p]^T,$$

and $$v = [v_i, v_i^2, \ldots, V_i^{qi}]T,$$

then the processor determines the combination coefficients that result in minimum uncertainty (step 1905) as:

$$\alpha_i = \frac{\frac{1}{(\delta M_{ci})^2}}{\sum_{j=1}^{n} \frac{1}{(\delta M_{cj})^2}}$$

where $\delta M_{ci}$ is the uncertainty in $M_{ci}$ if the common variables c are ignored. The processor then obtains the weighted average result (step 1910) and determines the resulting uncertainty in the weighted average result (step 1915) as:

An example of this technique is provided below. Two dependent variables:

$$M_1 = x+y, \quad M_2 = x+Z$$

are weighted to give the result:

$$R = \alpha_1 M_1 + \alpha_2 M_2$$

where $$\alpha_1 + \alpha_2 = 1.$$

The base variables x, y, z and their associated uncertainties are:

$$x = 0.2 + 0.1 N(t), \quad \delta x = 0.02 + 0.01 N(t),$$

$$y = 2.1 + 0.2 N(t), \quad \delta y = 0.2 + 0.1 N(t),$$

and $$z = 2.2 + 0.2 N(t), \quad \delta z = 0.25 + 0.1 N(t).$$

The squares of the uncertainties of the signals $M_n$, while ignoring the uncertainties of the common variables c, are $$(\delta M_{c1})^2 = (\delta y)^2 \text{ and } (\delta M_{c2})^2 = (\delta z)^2.$$

From this, the optimal combination coefficients are given by:

$$\alpha_1 = \frac{(\delta z)^2}{(\delta y)^2 + (\delta z)^2};$$

$$\alpha_2 = \frac{(\delta y)^2}{(\delta y)^2 + (\delta z)^2}$$

with the corresponding square of the uncertainty of the weighted average result R being:

$$\alpha_1 = \frac{(\delta z)^2}{(\delta y)^2 + (\delta z)^2};$$

$$\alpha_2 = \frac{(\delta y)^2}{(\delta y)^2 + (\delta z)^2}.$$

with the corresponding square of the uncertainty of the weighted average result R being:

$$(\delta W)^2 = \left[ \frac{1}{(\delta M_{c1})^2} + \frac{1}{(\delta M_{c2})^2} \right]^{-1} + (\delta x)^2 = \frac{(\delta y)^2 (\delta z)^2}{(\delta y)^2 + (\delta z)^2} + (\delta x)^2$$

Figure 30A:
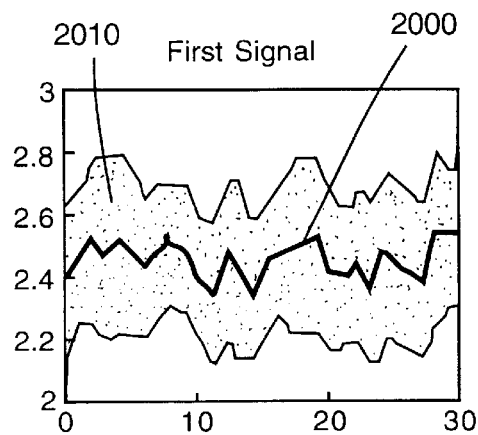
FIGS. 30A–30D are graphs of uncertainty measures.
Figure 30B:
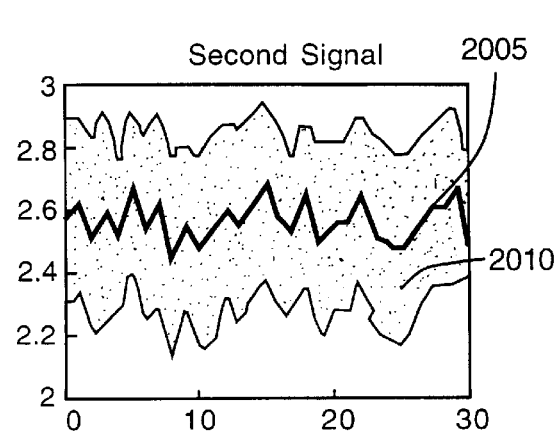
Figure 30C:
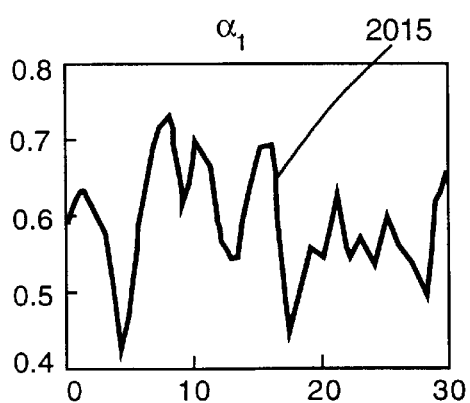
Figure 30D:
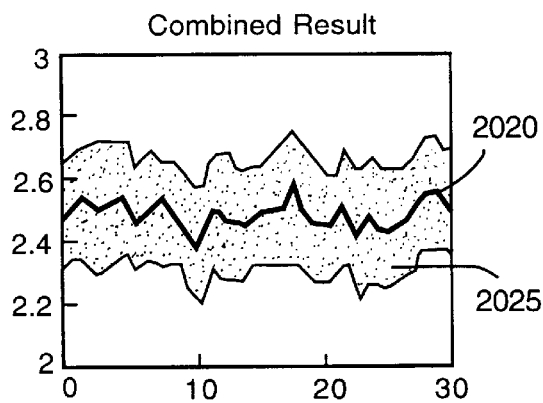

FIGS. 30A–30D illustrate the results for the simulation example described above. FIGS. 30A and 30B shows the signals $M_1$ 2000 and $M_2$ 2005 and their associated uncertainties 2010. FIG. 30C shows the coefficient $\alpha_1$ 2015. FIG. 30D shows the weighted average result R 2020 with its associated uncertainty 2025. It can be seen that the uncertainty of the weighted average result $\delta R$ 2025 is smaller than the uncertainties 2010 of both signals $M_1$ and $M_2$.

The result of the above discussion can be generalized to cover the combination of any dependent signals. If the square of the uncertainty of the result R is a function of the vector of combination coefficients such that:

$$(\delta R)^2 = F(\alpha)$$

where $$\alpha = [\alpha_1 \alpha_2, \ldots, \alpha_n]^T,$$

then the optimal combination coefficients can be determined by solving the equations:

$$\left(\frac{\partial f}{\partial \alpha_1}\right) = \left(\frac{\partial f}{\partial \alpha_2}\right) = \ldots = \left(\frac{\partial f}{\partial \alpha_n}\right)$$

and $$\sum_{i=1}^{n} \alpha_i = 1.$$

Suppose there are two dependent variables:

$$M_1 = ax + y, \quad M_2 = bx + z$$

where a=0.8 and b=1.2. These variables may be combined to give the result:

$$R = \alpha_1 M_1 + \alpha_2 M_2.$$

While the uncertainties of a and b are both 0.02, the base variables x, y, z and their associated uncertainties are:

$$x = 0.2 + 0.1 N(t), \quad \alpha x = 0.02 + 0.01 N(t),$$

$$y = 2.3 + 0.2 N(t), \quad \alpha y = 0.2 + 0.08 N(t),$$

and $$z = 2.1 + 0.2 N(t), \quad \alpha z = 0.2 + 0.16 N(t).$$

Previously, it has been shown that the square of the uncertainty in the result R is:

$$(\delta R)^2 = (\alpha_1 a + \alpha_2 b)^2 (\delta x)^2 + \alpha_1^2 x^2 (\delta a)^2 + \alpha_2^2 x^3 (\delta b)^2 + \alpha_1^2 (\delta y)^2 + \alpha_2^2 (\delta z)^2,$$

so that:

$$\frac{\partial (\delta R)^2}{\partial \alpha_1} = 2a(\alpha_1 a + \alpha_2 b)(\delta x)^2 + 2\alpha_1 [x^2 (\delta a)^2 + (\delta y)^2],$$

$$\frac{\partial (\delta R)^2}{\partial \alpha_2} = 2b(\alpha_1 a + \alpha_2 b)(\delta x)^2 + 2\alpha_2 [x^2 (\delta b)^2 + (\delta z)^2]$$

where $$\alpha_1 = \frac{x^2 (\delta b)^2 + b(b-a)(\delta x)^2 + (\delta z)^2}{[(\delta a)^2 + (\delta b)^2] x^2 + (a-b)^2 (\delta x)^2 + (\delta y)^2 + (\delta z)^2}$$

$$\alpha_2 = \frac{x^2 (\delta a)^2 + a(b-a)(\delta x)^2 + (\delta y)^2}{[(\delta a)^2 + (\delta b)^2] x^2 + (a-b)^2 (\delta x)^2 + (\delta y)^2 + (\delta z)^2}$$

Figure 31A:
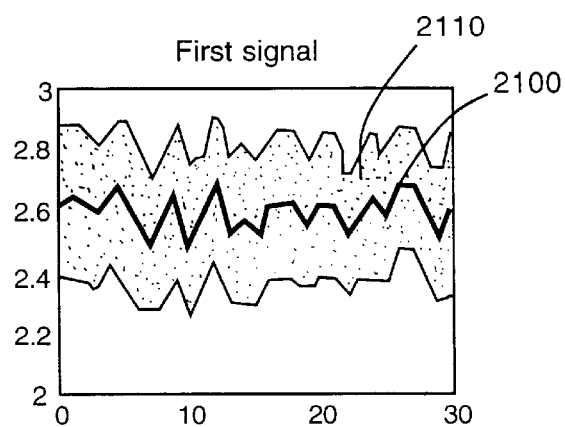
FIGS. 31A–31D are graphs of uncertainty measures.
Figure 31B:
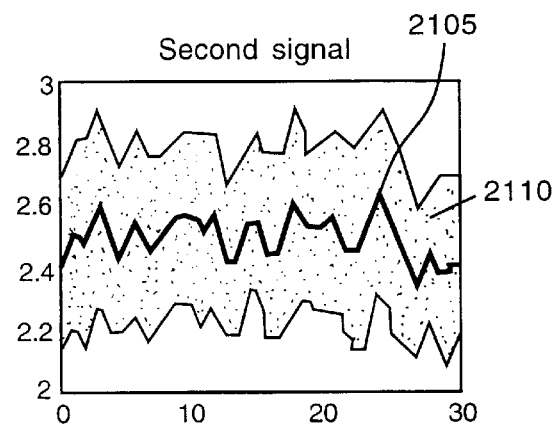
Figure 31C:
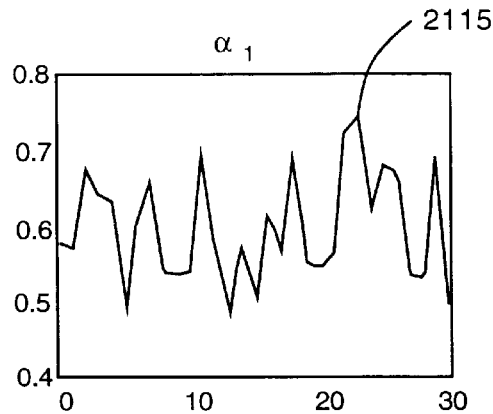
Figure 31D:
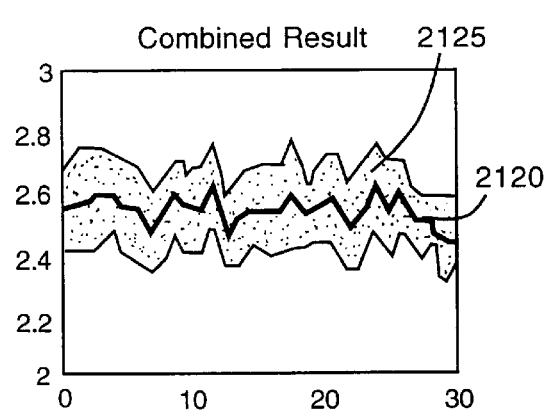
Figure 32A:
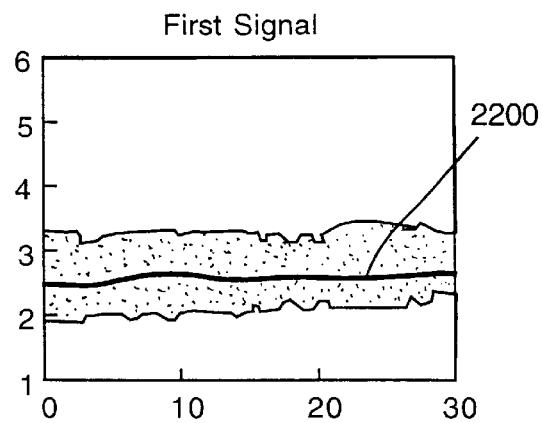
FIGS. 32A–32D are graphs of uncertainty measures.
Figure 32B:
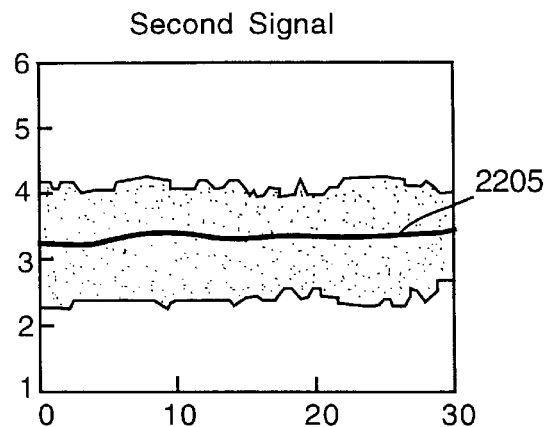
Figure 32C:
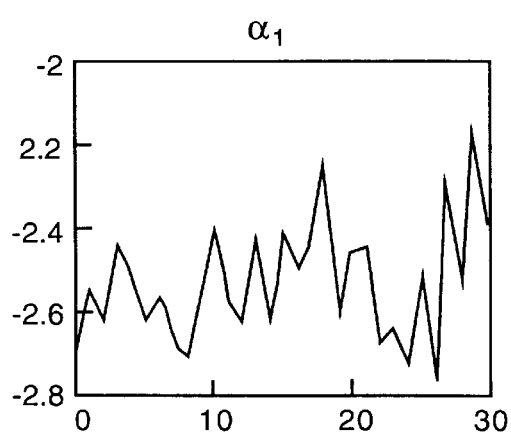
Figure 32D:
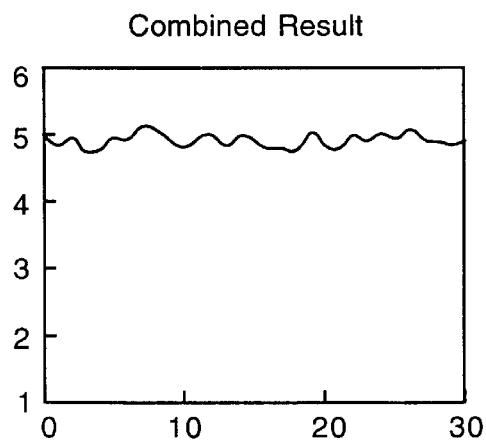

The results of this simulation are plotted in FIGS. 31A–D. FIGS. 31A and 31B show signals $M_1$ 2100 and $M_2$ 2105 and their associated uncertainties 2110. FIG. 31C and 31D illustrate the combination coefficient 2115 and the result R 2120 and its associated uncertainty $\delta R$ 2125 in the optimal case. From FIGS. 31A–31D, one can see that the combination coefficients have taken into account, in general, that signal $M_2$ 2105 has a higher uncertainty than signal $M_1$ 2100 (because $\delta z > \delta y$) and therefore more emphasis has been placed on signal $M_1$ 2100. Furthermore, the overall uncertainty 2125 in the result R is less than both the uncertainties of signals $M_1$ 2100 and $M_2$ 2105.

The technique described above may be applied, for example, when the sensor 100 includes multiple transducers measuring overlapping ranges of process readings and the temperature compensation coefficient required for each transducer is slightly different. If only one temperature sensor is employed in the transmitter, then readings from the different transducers can be combined using the suggested formula to give the best estimated measurement of minimum resulting uncertainty. For example, the method could be applied if a and b are temperature combination coefficients for the different readings and x is the temperature determined by the transducer.

If there are no constraints on the relative values of the various parameters, then some of the optimal coefficients may be outside the range 0 to 1, leading to the result R which is outside the uncertainty bounds of both signals $M_1$ and $M_2$. This is illustrated in the following example where a=0.8 and b=1.2 and $$x = 2.0 + 0.1 N(t), \quad \alpha x = 0.2 + 0.1 N(t),$$

$$y = 1.0 + 0.02 N(t), \quad \alpha y = 0.02 + 0.008 N(t),$$

and $$z = 0.8 + 0.02 N(t), \quad \alpha z = 0.020 + 0.016 N(t).$$

In FIGS. 32A–32D, one can seen that although the result R has a very small uncertainty (around 0.11), the result R with a mean value of approximately 4.8 is outside the ranges of both signals $M_1$ 2200 and $M_2$ 2205. Therefore, the combined result is meaningless. For the case of:

$$M_1 = ax + y \text{ and } M_2 = bx + z,$$

analysis shows that in order for the technique to be meaningful the conditions $$(\alpha M_1)^2 = a^2 (\alpha x)^2 + x^2 (\alpha a)^2 + (\alpha y)^2 > ab(\alpha x)^2, \text{ and}$$

$$(\alpha M_2)^2 = b^2 (\alpha x)^2 + x^2 (\alpha b)^2 + (\alpha z)^2 > ab(\alpha x)^2,$$

must be satisfied.

Other embodiments are within the scope of the following claims.

A portion of the disclosure of this patent document contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

What is claimed is:

1. A method of compensating for variations in a transfer function of a sensor, comprising:

identifying a desired transfer function for the sensor;

determining an actual transfer function for the sensor;

receiving a measurement produced by the sensor;

modifying the measurement based on the desired and actual transfer functions to produce a modified measurement; and providing the modified measurement as a measurement value for the sensor.

2. The method of claim 1, wherein the desired transfer function is identified from design criteria for the sensor.

3. The method of claim 2, wherein the actual transfer function varies with time, and wherein the step of determining the actual transfer function comprises determining the actual transfer function for a particular time or period of time for which a measurement value is to be produced.

4. The method of claim 3, wherein the sensor comprises a thermocouple, and wherein the step of determining the actual transfer function comprises using current injection tests.

5. The method of claim 1, wherein the actual transfer function varies with time, and wherein the step of determining the actual transfer function comprises determining the actual transfer function for a particular time or period of time for which a measurement value is to be produced.

6. The method of claim 5, wherein the sensor comprises a thermocouple, and wherein the step of determining the actual transfer function comprises using current injection tests.

7. The method of claim 1, wherein the step of modifying the measurement comprises modifying the measurement based on an inverse of the actual transfer function to produce a compensated measurement.

8. The method of claim 7, wherein the step of modifying the measurement comprises modifying the compensated measurement based on the desired transfer function to produce the modified measurement.

9. The method of claim 1, further comprising generating an uncertainty measure for the measurement value.

10. The method of claim 9, wherein the step of modifying the measurement comprises modifying the measurement based on an inverse of the actual transfer function to produce a compensated measurement and modifying the compensated measurement based on the desired transfer function to produce the modified measurement.

11. The method of claim 10, wherein the step of generating an uncertainty measure comprises generating a first uncertainty measure for the compensated measurement, generating a second uncertainty measure for the desired transfer function, and combining the first and second uncertainty measures to produce the uncertainty measure for the measurement value.

12. The method of claim 11, wherein the step of generating the first uncertainty measure for the compensated measurement comprises:

generating a third uncertainty measure for the measurement produced by the sensor, generating a fourth uncertainty measure for the inverse of the actual transfer function, and combining the third and fourth uncertainty measures to produce the first uncertainty measure for the compensated measurement.

13. A method of compensating for variations in a transfer function of a sensor, comprising:

identifying a desired transfer function for the sensor;
determining an actual transfer function for the sensor;
receiving a measurement produced by the sensor;
modifying the measurement based on an inverse of the actual transfer function to produce a compensated measurement;

modifying the compensated measurement based on the desired transfer function to produce a modified measurement;

providing the modified measurement as a measurement value for the sensor;

generating a first uncertainty measure for the compensated measurement;

generating a second uncertainty measure for the desired transfer function; and combining the first and second uncertainty measures to produce an uncertainty measure for the measurement value.

14. The method of claim 13, wherein the desired transfer function is identified from design criteria for the sensor design.

15. The method of claim 14, wherein the actual transfer function varies with time, and wherein the step of determining the actual transfer function comprises determining the actual transfer function for a particular time or period of time for which a measurement value is to be produced.

16. The method of claim 15, wherein the sensor comprises a thermocouple, and wherein the step of determining the actual transfer function comprises using current injection tests.

17. A sensor for providing a measurement value, the sensor comprising:

a transducer configured to generate a measurement, and a transmitter configured to:
identify a desired transfer function for the transducer;
determine an actual transfer function for the transducer;
receive the measurement generated by the transducer;
modify the measurement based on the desired and actual transfer functions to produce a modified measurement; and
provide the modified measurement as a measurement value for the sensor.

18. The sensor of claim 17, wherein the transmitter identifies the desired transfer function from design criteria for the sensor.

19. The sensor of claim 18, wherein the actual transfer function varies with time, and wherein the transmitter determines the actual transfer function for a particular time or period of time for which the measurement value is to be produced.

20. The sensor of claim 19, wherein the transducer comprises a thermocouple, and wherein the transmitter determines the actual transfer function using current injection tests.

21. The sensor of claim 17, wherein the actual transfer function varies with time, and wherein the transmitter determines the actual transfer function for a particular time or period of time for which the measurement value is to be produced.

22. The sensor of claim 21, wherein the transducer comprises a thermocouple, and wherein the transmitter determines the actual transfer function using current injection tests.

23. The sensor of claim 17, wherein the transmitter modifies the measurement based on an inverse of the actual transfer function to produce a compensated measurement.

24. The sensor of claim 23, wherein the transmitter modifies the measurement based on the desired transfer function to produce the modified measurement.

25. The sensor of claim 17, wherein the transmitter is further operable to generate an uncertainty measure for the measurement value.

26. The sensor of claim 19, wherein the transmitter modifies the measurement based on an inverse of the actual transfer function to produce a compensated measurement and modifies the compensated measurement based on the desired transfer function to produce the modified measurement.

27. The sensor of claim 26, wherein the transmitter generates a first uncertainty measure for the compensated measurement, generates a second uncertainty measure for the desired transfer function, and combines the first and second uncertainty measures to produce the measurement value.

28. The sensor of claim 27, wherein the transmitter generates the first uncertainty measure generating a third uncertainty measure for the measurement, generating a fourth uncertainty measure for the inverse of the actual transfer function, and combining the third and fourth uncertainty measures to produce the first uncertainty measure for the compensated measurement.

* * * * *